US012469659B2

(12) United States Patent
Boettcher et al.

(10) Patent No.: US 12,469,659 B2
(45) **Date of Patent: *Nov. 11, 2025**

(54) MICROELECTROMECHANICAL SYSTEMS POWER RELAY

(71) Applicant: Atomic Machines, Inc., Berkeley, CA (US)

(72) Inventors: William Boettcher, Berkeley, CA (US); Eric Meshot, Berkeley, CA (US); Fabian Goericke, Berkeley, CA (US); Gregory C. Ghahramani, Berkeley, CA (US); Klaus Zietlow, Berkeley, CA (US); Jeffrey Holden, Berkeley, CA (US); James Stölken, Berkeley, CA (US)

(73) Assignee: Atomic Machines, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,308

(22) Filed: Jun. 14, 2024

(65) Prior Publication Data

US 2025/0191864 A1 Jun. 12, 2025

Related U.S. Application Data

(60) Provisional application No. 63/508,748, filed on Jun. 16, 2023.

(51) Int. Cl.

| | |
|---|---|
| ***H01H 50/36*** | (2006.01) |
| ***H01H 50/44*** | (2006.01) |
| ***H01H 50/64*** | (2006.01) |

(52) U.S. Cl.
CPC ............ *H01H 50/36* (2013.01); *H01H 50/44* (2013.01); *H01H 50/641* (2013.01)

(58) Field of Classification Search
CPC ....... H01H 50/36; H01H 50/44; H01H 50/641
USPC .......................................................... 335/185
See application file for complete search history.

(56) References Cited

U.S. PATENT DOCUMENTS

| | | | | |
|---|---|---|---|---|
| 6,587,021 | B1 | 7/2003 | Streeter | |
| 2003/0043003 | A1 | 3/2003 | Vollmers et al. | |
| 2013/0247362 | A1 | 9/2013 | Baks et al. | |
| 2014/0077906 | A1 | 3/2014 | Christenson | |
| 2015/0054605 | A1* | 2/2015 | Kubono ................. | H01H 9/443 335/177 |
| 2015/0155123 | A1 | 6/2015 | Wilson et al. | |

(Continued)

*Primary Examiner* — Shawki S Ismail
*Assistant Examiner* — Lisa N Homza
(74) *Attorney, Agent, or Firm* — David D. Hsu; Polsinelli LLP

(57) ABSTRACT

A power relay having an actuator with a microelectromechanical systems stator assembly and plunger assembly that moves along the central longitudinal axis between a first position and a second position, the plunger assembly including a plunger that includes a pair of ferromagnetic plates with a magnet situated therebetween, and a first ferromagnetic plate of the pair of ferromagnetic plates is situated between first and second ferromagnetic layers in the stator assembly and a second ferromagnetic plate of the pair of ferromagnetic plates is situated between the second and third ferromagnetic layers in the stator assembly. Contacts formed by the ferromagnetic plates and ferromagnetic layers may include an array of micromachined flexures or a stabilized liquid-solid electrical contact.

24 Claims, 25 Drawing Sheets

"Open State" - Load Disconnected From Load-Stops

"Closed State" - Load Connected To Load-Stops

(56) References Cited

U.S. PATENT DOCUMENTS

| | | | | |
|---|---|---|---|---|
| 2016/0181038 | A1* | 6/2016 | Shimizu | H01H 50/42<br>335/165 |
| 2018/0248432 | A1* | 8/2018 | Ikeda | H02K 11/33 |
| 2019/0311871 | A1* | 10/2019 | Minowa | H01H 1/64 |
| 2021/0180578 | A1* | 6/2021 | Chida | F04B 53/14 |
| 2022/0115199 | A1* | 4/2022 | Mantoan | H01H 49/00 |
| 2022/0115200 | A1* | 4/2022 | Mantoan | H01H 51/01 |

* cited by examiner

MICROELECTROMECHANICAL SYSTEMS POWER RELAY

BACKGROUND

Cross-Reference to Related Application

This application claims priority to U.S. Provisional Patent Application No. 63/508,748, filed Jun. 16, 2023, entitled "MICROELECTROMECHANICAL SYSTEMS POWER RELAY", the entire disclosure of which is hereby incorporated by reference, for all purposes, as if fully set forth herein.

Technical Field

The present disclosure pertains to devices for managing electrical power and, more particularly, to a power relay that is constructed with a micro-electromechanical (MEMS) structure.

Description of the Related Art

Controlling electric power is important in many areas in today's electrified world. A smarter power supply grid can allow utilities to manage power on an extremely local basis, allowing a power provider or customer to turn off selected devices at times of peak demand. This can allow suppliers to avoid instituting rolling blackouts to prevent the grid from failing. Instead they can disable high current loads such as laundry equipment and air conditioners until peak loads subside.

To provide this level of control, utility companies need remotely addressable switches in the form of relays. Existing relays are large and inefficient, evolving sufficient heat at the required current level that large heat sinks become necessary. As such, these relays are too large to fit into existing circuit breakers, requiring updates to load centers to support their installation. A small, low-contact-resistance relay is needed to address this problem.

Another application of such a small relay would be in data processing centers. These centers may have hundreds of thousands of servers. Operators need to have and/or provide (as a cloud service) the ability to remotely cycle power individually on each server. The power distribution units (PDUs) used for this purpose often have individual circuit breakers for each outlet and separate relays. By moving the relay inside the circuit breaker (only possible with a very small relay that does not require a heat sink at the required current levels) and shrinking the breaker, the PDUs can be significantly reduced in size, an important metric for highly dense modern data centers.

BRIEF SUMMARY

The present disclosure is directed to a power relay that is constructed using a microelectromechanical (MEMS) structure. The relay utilizes three novel MEMS structures either individually or in combinations thereof.

In accordance with one aspect of the present disclosure, a power relay is provided that utilizes an actuator having a stator assembly that has a chamber partially defined therethrough along a central longitudinal axis, the stator assembly including a non-conductive substrate having a top surface, a layer or layers including components with which a load interacts mechanically or electrically, a first ferromagnetic layer that is adjacent to a spacer, a first plurality of coils that are adjacent to the first ferromagnetic layer, a second ferromagnetic layer that is adjacent to the first plurality of coils, a second plurality of coils that are adjacent to the second ferromagnetic layer, and a third ferromagnetic layer that is adjacent to the second plurality of coils, wherein a bottom surface of the third ferromagnetic layer defines a top end of the chamber.

The power relay further includes a plunger assembly that is situated in the chamber of the stator assembly and, in operation, moves along the central longitudinal axis between a first position and a second position, the plunger assembly including a plunger that includes a pair of ferromagnetic plates with a magnet situated therebetween. A first ferromagnetic plate of the pair of ferromagnetic plates is situated between the first and second ferromagnetic layers of the stator assembly and (ii) a second ferromagnetic plate of the pair of ferromagnetic plates is situated between the second and third ferromagnetic layers of the stator assembly.

In accordance with another aspect of the present disclosure, the foregoing power relay utilizes a contact that, in a first alternative, includes a first contact member having an exposed surface, the exposed surface having asperities that form one or more high points and low points on the exposed surface; and a second contact member having a contact surface, and a plurality of electrically conductive flexures extending from the contact surface, wherein the first contact member and the second contact member may be moved relative to each other to provide differentiated open and closed positions, and further wherein, when the first contact member is positioned adjacent the second contact member in a closed position in which the contact surface of the second contact member is not in electrical contact with the one or more high points on the exposed surface of the first contact member, each flexure of the plurality of electrically conductive flexures is in electrical contact with the exposed surface of the first contact member.

In accordance with another aspect of the contact of the present disclosure, all of the plurality of electrically conductive flexures extending from the contact surface of the second contact member have an identical height above the contact surface of the first contact member, the height being greater than a sum of a first distance between the high points and the low points on an exposed surface of the first contact member and a separation distance between the exposed surface of the first contact member and the high point of contact surface of the second contact member when the first contact member is in the closed position.

Alternatively and in accordance with a further aspect of the present disclosure, the power relay with the actuator described above includes a contact having a first contact member having a base with an exposed surface, the base having a first pocket opening to the exposed surface, the first pocket having a circumscribing side wall and a bottom wall that defines an interior of the first pocket; a first metal layer on the bottom wall of the first pocket and having a top surface that is below the exposed surface of the first contact member; a liquid metal layer on the top surface only of the first metal layer and extending above the exposed surface of the first contact member; and a second contact member having a contact surface, the second contact member positioned adjacent the first contact member in an open position and movable to a closed position in which the contact surface of the second contact member contacts and compresses the liquid metal layer and the first metal layer until the contact surface of the second contact member abuts the exposed surface of the first contact member.

In accordance with another aspect of the power relay contact above, the contact includes a second pocket formed in the exposed surface of the first contact member, the second pocket circumscribing the first pocket and having a bottom wall that is below the exposed surface of the first contact member and above the bottom wall of the first pocket, the second pocket further comprising a circumscribing side wall and a bottom wall that define an interior of the second pocket, a portion of the interior of the second pocket overlapping the interior of the first pocket.

In accordance with a further aspect of the foregoing contact of the present disclosure, the liquid metal layer is formed of a compliant material that is displaced by pressure applied by the second contact member in the closed position and returns to an original shape in response to the second contact member moving to the open position.

In accordance with still yet another aspect of the present disclosure, a power relay is provided that includes the actuator described above in combination with a contact that includes a first contact member having an exposed surface, the exposed surface having asperities that form one or more high points and low points on the exposed surface; and a second contact member having a contact surface, and a plurality of electrically conductive flexures extending from the contact surface; wherein the first contact member and the second contact member may be moved relative to each other to provide differentiated open and closed positions; and further wherein, when the first contact member is positioned adjacent the second contact member in a closed position in which the contact surface of the second contact member is not in electrical contact with the one or more high points on the exposed surface of the first contact member, each flexure of the plurality of electrically conductive flexures is in electrical contact with the exposed surface of the first contact member.

In accordance with yet another aspect of the present disclosure, a power relay is provided that includes the actuator described above in combination with a contact having a first contact member having a base with an exposed surface, the base having a first pocket opening to the exposed surface, the first pocket having a circumscribing side wall and a bottom wall that defines an interior of the first pocket; a first metal layer on the bottom wall of the first pocket and having a top surface that is below the exposed surface of the first contact member; a liquid metal layer on the top surface only of the first metal layer and extending above the exposed surface of the first contact member; and a second contact member having a contact surface, the second contact member positioned adjacent the first contact member in an open position and movable to a closed position in which the contact surface of the second contact member contacts and compresses the liquid metal layer and the first metal layer until the contact surface of the second contact member abuts the exposed surface of the first contact member.

In accordance with another aspect of the power relay contact above, the contact includes a second pocket formed in the exposed surface of the first contact member, the second pocket circumscribing the first pocket and having a bottom wall that is below the exposed surface of the first contact member and above the bottom wall of the first pocket, the second pocket further comprising a circumscribing side wall and a bottom wall that define an interior of the second pocket, a portion of the interior of the second pocket overlapping the interior of the first pocket.

In accordance with a further aspect of the foregoing contact of the present disclosure, the liquid metal layer is formed of a compliant material that is displaced by pressure applied by the second contact member in the closed position and returns to an original shape in response to the second contact member moving to the open position.

In accordance with a further aspect of the foregoing contact of the present disclosure, the first metal layer and the liquid metal layer may rest directly on the top flat surface of the first contact member, without the presence of a first or second pocket.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

Figure 1:
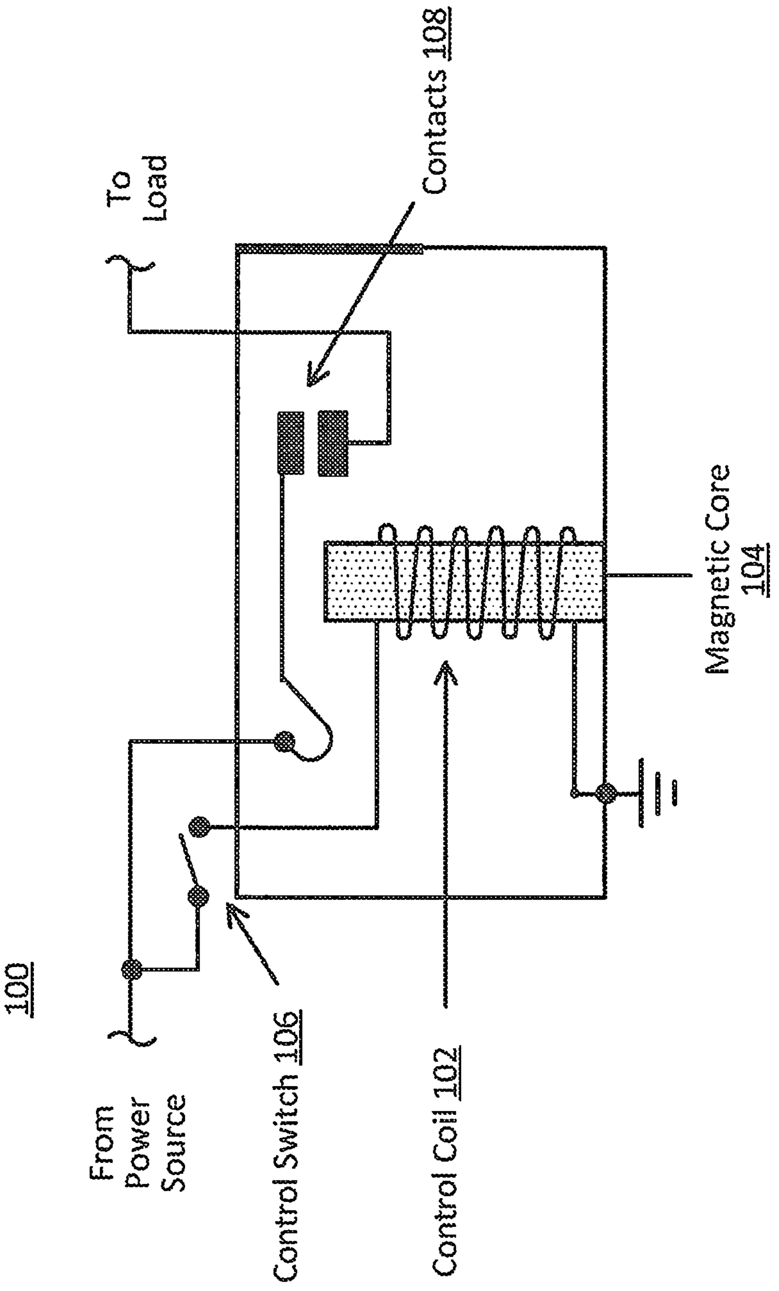
FIG. 1 PRIOR ART
FIG. 1 includes a diagrammatic illustration of a solenoid or actuator having a traditional electromagnetic form.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with breakers, relays, coils, and typical electrical components have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

The terms "connected," "coupled," and any variants thereof are intended to include any connection or coupling between two or more elements, either direct or indirect. The connection or coupling can be physical, logical, or a combination thereof. For example, objects may be electrically or communicatively connected to one another despite not sharing a physical connection.

Reference throughout this specification to "one implementation" or "an implementation" means that a particular feature, structure, or characteristic described in connection with the implementation is included in at least one implementation. Thus, the appearance of the phrases "in one implementation" or "in an implementation" in various places throughout this specification are not necessarily all referring to the same implementation. Furthermore, the particular features, structures, or characteristics may be combined in any suitable manner in one or more implementations. It will be appreciated that for simplicity and clarity of illustration, where considered appropriate, reference numerals may be repeated among the figures to indicate corresponding or analogous elements or steps.

The headings and Abstract of the Disclosure provided herein are for convenience only and do not interpret the scope or meaning of the implementations.

Principles of Operation

Overview

Method of Use

This device is driven with a defined pulse of current through the coils. A positive current pulse opens the relay, and a negative pulse (i.e., a pulse in the opposite direction) closes it.

Magnetic Latching

To avoid requiring continuous drive current to remain open or closed, this implementation is designed to 'latch' in place whenever it is switched. This is accomplished by designing the actuator to be magnetically bistable.

Low Resistance Contacts

For the relay to be practical at low spatial volume and high currents, it must have extremely low contact resistance. As set forth more fully hereinbelow, there are implemented two different approaches to achieving contact resistance of less than 100 microOhms. These two approaches are using liquid metal wetting and arrays of micro-machined flexures. Other approaches may also fit the low resistance requirement for such a MEMS relay design.

Liquid Metal Contacts

A thin layer of liquid metal fills in gaps between the contact and crossbar surfaces caused by roughness and misalignment, and should be as thin as possible while still fulfilling this function. Liquid metal and contact materials should be selected for high electrical conductivity, sufficient surface adhesion, and sufficient longevity at the operating temperature (as limited by diffusion).

As described more fully below, a preferred implementation currently uses a gallium-indium-tin eutectic or near eutectic alloy on a tungsten base contact with a tantalum adhesion layer. Other substrate materials include copper, molybdenum. Suitable liquid contact layers include cesium-potassium-sodium, elemental gallium and other gallium-based alloys (e.g., with indium, tin, zinc, and/or bismuth), mercury, sodium potassium alloy (NaK), cesium, rubidium, and francium. Adding other components to the liquid metal mixture may provide enhanced characteristics, such as adding cesium to NaK to lower its freezing point to −78° C., or adding lithium to NaK to improve its ability to bond to copper or other metals. Base contact materials may be treated to form thin layers of intermetallic material to prevent diffusion into or out of the liquid metal, or to promote adhesion of the liquid metal to the base contact.

Micromachined Flexure Contacts

Contact resistance is generally inversely proportional to the square root of the force applied to squeeze a pair of contacts together. Having an array of small flexible contacts allows many small contact points with a relatively small amount of force. This is critical to enable the small physical size of the MEMS relay. The resistance is inversely proportional to the square root of the number of flexible contacts; thus a contact with 100 micro flexures on its surface will exhibit $1/10^{th}$ the resistance of a single solid contact.

Package and Internal Environment

For wetted contacts, the package must be sufficiently hermetic and the internal environment sufficiently water and oxygen-free to prevent destruction of the wetted contacts by oxidation.

The package is filled with a chemically inert, electrically insulating gas above 1 atmosphere to provide sufficient dielectric standoff for a given stroke length. Using a pressure above 1 atmosphere also applies a pressure bias across any leakage paths through the package, preventing ingress or egress of atmosphere.

The preferred implementation uses a gas consisting primarily or entirely of nitrogen, but which may be mixed with other insulating gasses to improve arc resistance. One such gas to mix with nitrogen is helium, which is commonly used for leak detection and therefore can aid in verifying a hermetic seal of a relay package. Other possible implementations may use insulating liquids (such as hexamethyl disiloxane, a low molecular weight silicone oil).

A more detailed description of the foregoing micromachined structures follows below. These micromachined structures can be utilized individually or in certain combinations described herein to form a power relay in accordance with the present disclosure.

Microelectromechanical Systems (MEMS) Actuator with Magnetic Latching and Methods for Manufacturing and Using the Same FIG. 1 includes a diagrammatic illustration of a solenoid or actuator 100 having a traditional electromagnetic form. The traditional electromagnet form includes a control coil 102 that is wrapped around a ferromagnetic core 104. Application of an electrical current through control coil 102 creates a magnetic field with general orientation parallel to the axis of the control coil 102. This magnetic field attracts the upper of the two contacts 108. The upper contact moves downward until it touches the lower contact 108. This closes the switch allowing current to flow from the power source to the load. When the current through the control coil 102 is interrupted by opening Control Switch 106, the upper contact 108 is restored to its neutral open position by spring force.

Typically, conventional electromechanical actuators are at least several centimeters in both length and width. Their construction requires coils of windings, which must be formed using bobbin-winding machinery. The winding of a coil adds to the complexity, and therefore the cost, of producing such an actuator. In contrast, the electromechanical actuators introduced here allow for the use of planar circuitry, reducing the complexity of forming the coils, and allowing the resulting device to be much smaller, with dimensions of 1 millimeter (mm)×6 mm×6 mm or less. This allows the resulting device to be used in applications requiring a small size.

Traditional solenoid actuators are typically not latched in position at the end of the stroke, and even in implementations where latching is possible, latching is typically achieved using a mechanical means. The mechanical latch adds a moving part to the design which increases its cost and reduces reliability. The electromechanical actuator introduced here provides magnetic latching at each end of the stroke as a function of its design, and with no additional components required. The magnetic latching is completely passive and requires no external energy to retain the plunger at either end of the stroke.

Overview of Electromechanical Actuator

At a high level, the electromechanical actuators described herein are laminated devices, generally manufactured by cutting thin sheets of material and then bonding those thin sheets together in stacks as further discussed below. With successive cutting/bonding iterations, the structures that collectively comprise an electromechanical actuator can be placed in-plane with each other in nearly any arbitrary configuration.

Figure 2A:
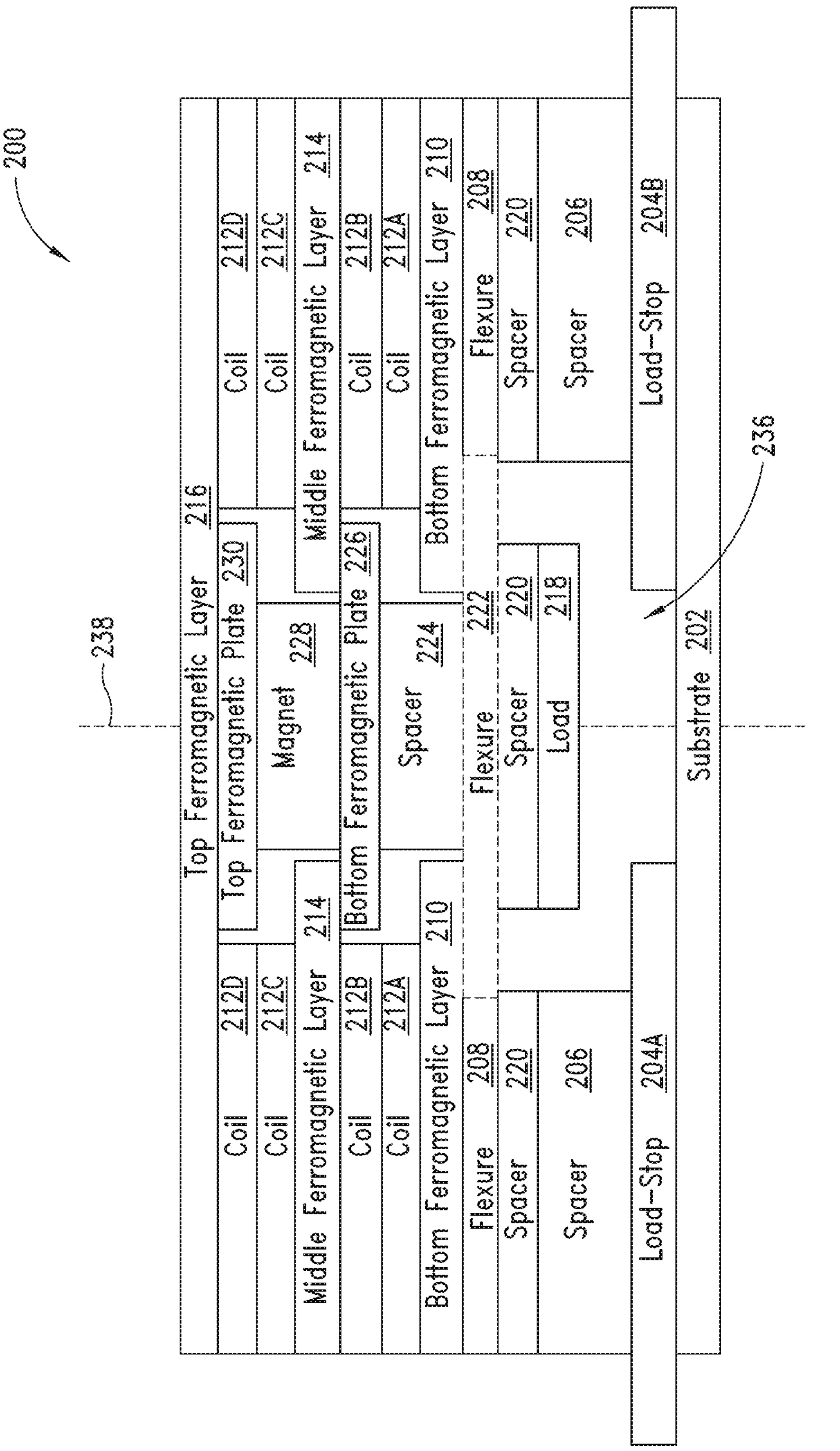
FIG. 2A includes a cross-sectional view of the various layers of an actuator in accordance with various embodiments of the present disclosure.
Figure 2B:
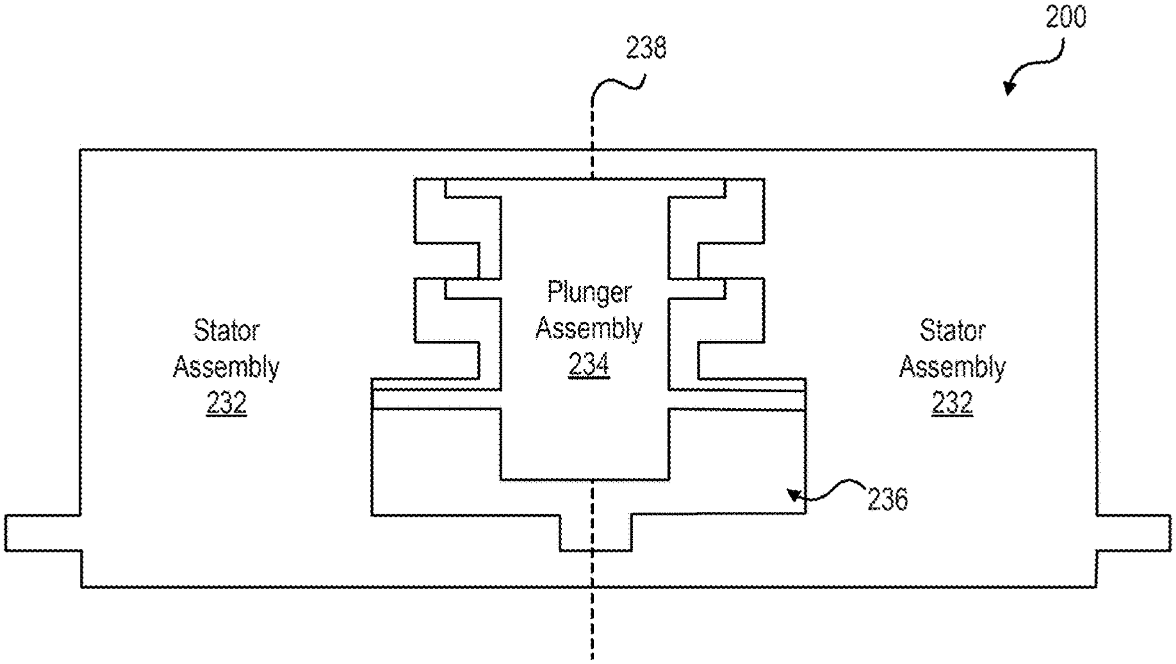
FIGS. 2B and 2C illustrate how the various layers of the electromechanical actuator shown in FIG. 2A generally correspond to one of two "stacks," namely, a static stack (also called a "stator assembly") or an actuatable stack (also called a "rotor assembly" or "plunger assembly")
Figure 2C:
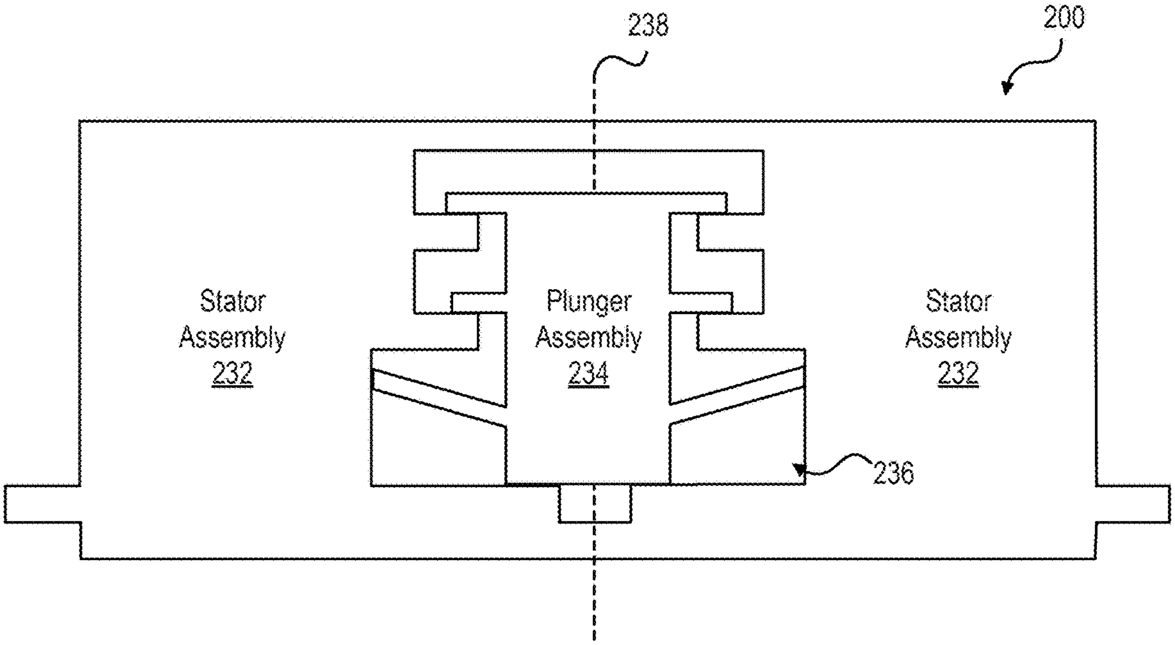

FIG. 2A includes a cross-sectional view of the various layers of an electromechanical actuator 200 in accordance with various embodiments of the present disclosure. Meanwhile, FIGS. 2B-2C illustrate how the various layers of the electromechanical actuator 200 generally correspond to one of two "stacks," namely, a static stack 232 (also called a "static assembly," "stator assembly" or simply "stator") or an actuatable stack 234 (also called an "actuatable assembly," "rotor assembly," "plunger assembly," or "plunger"). As further discussed below, the plunger assembly 234 can be vertically displaced within the stator assembly 232 in order to controllably move a load 218 positioned below a spacer 220.

Referring again to FIG. 2A, the stator assembly 232 is representative of a collection of layers that have a chamber 236 partially defined therethrough along a central longitudinal axis 238. The central longitudinal axis 238 may roughly bisect the width of the electromechanical actuator 200. A substrate 202 can be the bottommost layer of the stator assembly 232. The substrate 202 may be a small block of insulating material on which a functional component—for example, a relay or valve—is fabricated to complete an electromechanical device. The insulating material could be ceramic or glass, for example. Insulation may not always be necessary (e.g., insulation may be helpful if the electromechanical actuator 200 forms part of an electrical switch). As such, the substrate 202 may alternatively be comprised of a non-insulating material on which the functional component is fabricated to complete an electromechanical device. Some embodiments may not include a substrate 202 at all, in which case the load-stops 204A-B may be the bottommost layers of the electromechanical actuator 200.

In terms of "footprint," it is generally desirable to make the electromechanical actuator 200 as small as possible within the limits set by current density. Cost and magnetic performance tend to scale favorably as size decreases. For example, the actuation force may be proportional to the square root of the moving magnet mass of the electromechanical actuator 200 and the square root of power consumed. In general, the substrate 202 may be less than four mm thick (and preferably less than 3 mm thick). The thickness of the substrate 202 may be fundamental to the operation of the electromechanical device, and therefore may not depend heavily on the intended application of the electromechanical actuator 200. The shape, length, and width of the substrate 202 may vary depending on the intended application of the electromechanical actuator 200. However, in some embodiments, the length may not exceed 10 mm, 20 mm, 25 mm, or 50 mm, and the width may not exceed 10 mm, 20 mm, 25 mm, or 50 mm. Accordingly, the surface area of the substrate 202 may be less than 100 $mm^2$ (i.e., 10 mm×10 mm), 400 $mm^2$ (i.e., 20 mm×20 mm), 625 $mm^2$ (i.e., 25 mm×25 mm), or 2,500 $mm^2$ (i.e., 50 mm×50 mm). In other embodiments, the length and/or width may exceed 50 mm, and therefore the surface area of the substrate 202 may exceed 625 $mm^2$, as there are no fundamental size constraints on the electromechanical actuator 200.

The stator assembly 232 and plunger assembly 234, as shown in FIG. 2B, can be connected to one another by one or more flexures that are intended to constrain lateral motion of the plunger assembly 234 as it moves vertically within the chamber of the stator assembly 232, as well as to control, inhibit, or limit tilting. Specifically, a flexure may be designed to provide a desired axial force when the plunger assembly 234 is latched, such that the axial force provided by the flexure counters the latching force to enable and support faster movement of the plunger assembly 234 when current is applied to the coils in the stator assembly 232. In some embodiments, multiple flexures are used to constrain torsional movement ("tilting") and horizontal movement of the plunger assembly 234, while in other embodiments, a single flexure is used to constrain horizontal movement of the plunger assembly 234 with a generally lesser degree of torsional constraint.

The flexures 208, 222 are compliant mechanisms that require relatively little force to deflect in the direction of actuation (i.e., along the central longitudinal axis 238) but require much larger amounts of force to deflect in any other direction. As further discussed below, the flexures 208, 222 may be representative of different parts of the same flexure, which flexibly connects the stator assembly 232 and plunger assembly 234. This property largely constrains the plunger assembly 234 to taking the same path through the center of the stator assembly 232 during every actuation. Moreover, this property largely or entirely eliminates friction between the stator assembly 232 and plunger assembly 234 and limits rotation of the plunger assembly 234 inside the chamber 236 of the stator assembly 232. In the embodiment shown in FIG. 2A, the flexures 208, 222—again, which may be representative of different components of a single flexure—can apply a "bias force" to the plunger assembly 234 in either direction, which allows for higher initial actuation force (and consequently faster displacement) during actuation. Generally, the flexures 208, 222 are comprised of metal, metal alloy, or polymer.

As shown in FIG. 2A, the stator assembly can include a series of ferromagnetic layers with coils situated therebetween. During actuation, current is applied to the coils to magnetically polarize the series of ferromagnetic layers as further discussed below. In the embodiment shown in FIG. 2A, the stator assembly 232 includes a trinity of ferromagnetic layers, namely, a first ferromagnetic layer 210 (also called the "bottom ferromagnetic layer"), a second ferromagnetic layer 214 (also called the "middle ferromagnetic layer"), and a third ferromagnetic layer 216 (also called the "top ferromagnetic layer"). Generally, the bottom and middle ferromagnetic layers 210, 214 extend circumferentially around the chamber 236, and therefore may have an annular form. Meanwhile, the top ferromagnetic layer 216 may extend across the entire width of the stator assembly 232, such that its bottom surface defines the upper end of the chamber 236. While the top ferromagnetic layer 216 shown in FIG. 2A has a disk form, the top ferromagnetic layer 216 could have an annular form similar to the middle and bottom ferromagnetic layers 214, 210. In such embodiments, the aperture in the top ferromagnetic layer 216 may allow for observation and/or metrology of the motion of the plunger assembly 234, and/or the connection of an additional load on the top of the plunger. Note that the aperture may be sized to ensure its diameter is smaller than the diameter of the top ferromagnetic plate 230, so as to ensure that the plunger assembly 234 remains fully constrained within the chamber of the stator assembly 232.

The bottom, middle, and top ferromagnetic layers 210, 214, 216 are generally only as thick as necessary to prevent magnetic saturation while the plunger assembly 234 is actuating within the chamber 236 of the stator assembly 232. Generally, the thickness of the bottom, middle, and top ferromagnetic layers 210, 214, 216 is no more than 0.4 mm (and preferably 0.3 mm). Most of the other layers included in the stator assembly 232 are less constrained, and therefore may be determined based on the intended application of the electromechanical actuator 200. For example, the thickness of the "coil stacks" may vary depending on the number of coils, and the thickness of the spacer 206 may depend on the plunger assembly 234, as a bottom portion of the plunger assembly 234 must be able to move—in the chamber 236—between the top surface of the load-stops 204A-B and the bottom surface of the bottom ferromagnetic layer 210. The load-stops 204A-B are the surfaces with which the load makes contact at the 'closed' end of its stroke. The load-stops 204A-B may serve different purposes depending on the device in which the actuator is incorporated. In a relay, for example, the load stops 204A-B may be conductive elements that are shorted together by the load 218 when the load 218 is in the closed position. In a MEMS valve, the load stops 204A-B (or a singular load stop) may be a valve seat. In this situation, the load 218 would become the valve itself, and would seal against the valve seat in the closed position. As such, the load-stops 204A-B are shown in FIG. 2A to illustrate surfaces with which the plunger makes contact. Note that various intermediary layers (e.g., flexures and spacers) have not been shown to simplify FIG. 2A. These various intermediary layers generally have thicknesses between 25-375 micrometers (μm) and widths of 1.5-6 mm. Generally, all of the layers shown in FIG. 2A have thicknesses of 25-375 μm and widths of 1.5-6 mm, though the dimensions may depend on the intended application of the electromechanical actuator 200.

One or more coils can be situated between each set of ferromagnetic layers. In the embodiment shown in FIG. 2A, for example, a first plurality of coils is situated between the bottom and middle ferromagnetic layers 210, 214, while a second plurality of coils is situated between the middle and top ferromagnetic layers 214, 216. Such a design results in the bottom ferromagnetic layer 210 being located adjacent to the load-stops 204A-B, the first plurality of coils being located adjacent to the bottom ferromagnetic layer 210, the middle ferromagnetic layer 214 being located adjacent to the first plurality of coils, the second plurality of coils being located adjacent to the middle ferromagnetic layer 214, and the top ferromagnetic layer 216 being located adjacent to the second plurality of coils. Note that the term "adjacent," as used herein, may be used to generally refer to the spatial relationship between two components. A first component may be "adjacent" to a second component without the respective sides adjoining one another. Therefore, there may be one or more intermediary components between components that are "adjacent" to one another. Conversely, the term "directly adjacent" is generally used to refer to components that adjoin one another without any intermediary components therebetween, with the exception of adhesives or other materials as may be required to bond them.

In the embodiment shown in FIG. 2A, the first plurality of coils includes a pair of coils 212A-B, while the second plurality of coils also includes a pair of coils 212C-D. While the first and second pluralities of coils include the same number of coils in FIG. 2A, the first and second plurality of coils could include different numbers of coils. For example, a single coil could be situated between a pair of ferromagnetic layers. The number of coils that is required may depend on the forces required to actuate given the latching force, the desired drive voltage and current, and the acceleration required to meet a desired opening time requirement and/or closing time requirement.

In operation, current is applied to the coils 212A-D as further discussed below. When this happens, the coils 212A-D produce magnetic fields in opposite directions, such that the bottom, middle, and top ferromagnetic layers 210, 214, 216 in the stator assembly 232 have inner poles in a north-south-north ("N-S-N") configuration or a south-north-south ("S-N-S") configuration from top to bottom depending on the direction of the current. Note that the term "inner pole" is used to describe the radial end of each ferromagnetic layer that is located nearest the plunger assembly 234. Because the plunger assembly 234 has two fixed poles (i.e., either a north-south configuration or south-north configuration, which is defined during manufacture of the plunger assembly 234 by the orientation of permanent magnet 228), all adjacent poles between the stator assembly 232 and plunger assembly 234 will push or pull in the same direction, and reversing the direction of the current will reverse the direction in which the stator assembly 232 and plunger assembly 234 are pushed or pulled.

The plunger assembly 234 is representative of another collection of layers that is situated in the chamber 236 of the stator assembly 232 and, in operation, moves along the central longitudinal axis 238 between the first and second positions.

As mentioned above, the stator assembly 232 and plunger assembly 234 can be connected to one another by one or more flexures. In the embodiment shown in FIG. 2A, the diagram features 208 and 222 are representative of different regions of a single flexure layer. Thus, the inner flexure region 222 may be directly connected to the outer flexure regions 208, and while the inner flexure region 222 may move vertically with the plunger assembly 234 by the elastic deformation of the flexure layer, the outer flexure regions 208 may remain static—embedded in the layers of the stator assembly 232—despite being connected to the inner flexure region 222. The flexure may be designed to permit vertical displacement between 0 and 25 microns, 25 and 100 microns, between 100 and 150 microns, between 150 and 200 microns, between 200 and 250 microns, or greater than 250 microns. The flexure can have various forms. For example, the flexure could be in the form of a disk with a circular annulus, or the flexure could have a central circular part and a hexagonal annulus, connected by three interconnecting segments (also called "arms") that flex. In FIG. 2A, the outer flexure region 208 is the hexagonal annulus while the inner flexure region 222 is the center circular part. Thus, the outer and inner flexure regions 208 and 222 are part of the same layer. In embodiments where the electromechanical actuator 200 includes multiple flexures, flexures could be arranged at different heights along the "stack." Having more than one flexure would provide better (i.e., stiffer) angular control of the motion of the plunger assembly 234, preventing the plunger assembly 234 from "tipping" as it moves vertically. Additional flexures may also allow stresses to be distributed between them, enabling longer fatigue lives and/or additional material options.

A spacer 224 may be situated along the top surface of the flexure 222, such that when the plunger assembly 234 is located in the first position, a bottom portion of the spacer 224 is horizontally aligned with the bottom ferromagnetic layer 210 of the stator assembly 232, as shown in FIG. 2A. When the plunger assembly 234 is located in the second position, a top portion of the spacer 224 may be horizontally aligned with the bottom ferromagnetic layer 210 of the stator assembly 232. At a high level, the thickness of the spacer 224 may be selected to accommodate controlled movement of the plunger assembly 234.

A plunger element (or simply "plunger") can be situated along the top surface of the spacer 224. The plunger element can include a permanent magnet 228 with ferromagnetic plates adhered, laminated, or otherwise secured along its top and bottom poles. Specifically, a bottom ferromagnetic plate 226 may be connected along the bottom pole of the permanent magnet 228, and a top ferromagnetic plate 230 may be connected along the top pole of the permanent magnet 228. As shown in FIG. 2A, the top and bottom ferromagnetic plates 226, 230 can sit between the ferromagnetic layers in the stator assembly 232. Specifically, the bottom ferromagnetic plate 226 may be situated between the bottom and middle ferromagnetic layers 210, 214, while the top ferromagnetic plate 230 may be situated between the middle and top ferromagnetic layers 214, 216. In operation, the top and bottom ferromagnetic plates 226, 230 can couple the permanent magnet 228 to the bottom, middle, and top ferromagnetic layers 210, 214, 216 by providing a low-reluctance path for magnetic fields generated by the coils 212A-D to follow.

Accordingly, the plunger assembly 234 may include (i) a load 218 which is a component driven by the actuator which performs some function when moved, (ii) a flexure 222 for controlling vertical movement along the central longitudinal axis 238, (iii) a spacer 224, and (iv) a permanent magnet 228 with top and bottom ferromagnetic plates 230, 226 secured along its poles. The top ferromagnetic plate 230 may be situated between the top and middle ferromagnetic layers 216, 214 of the stator assembly 232, while the bottom ferromagnetic plate 226 may be situated between the middle and bottom ferromagnetic layers 214, 210.

Thickness of the permanent magnet 228 is generally maximized within the constraints set by the surrounding layers and application of the electromechanical actuator 200, both mechanically and magnetically. For example, the magnet thickness may be selected so as not to exceed the saturation flux density of ferromagnetic plates 226 and 230. Similarly, the magnet thickness may also be selected such that the total magnetic flux is sufficient to produce adequate latching force for the intended application of a particular embodiment. Mechanical constraints on magnet thickness may include that vertical distance between the top surface of the bottom ferromagnetic plate 226 and the bottom surface of the top ferromagnetic plate 230 does not exceed the difference between the thickness of the middle ferromagnetic layer 214 and the intended length of the stroke. The thickness of the permanent magnet 228 may typically be sized such that the top ferromagnetic plate 230 makes contact with the top ferromagnetic layer 216 at the same time as the bottom ferromagnetic plate 226 touches the middle ferromagnetic layer 214 at the top of the stroke, and the top ferromagnetic plate 230 touches the middle ferromagnetic layer 214 at the same time as the bottom ferromagnetic plate 226 touches the bottom ferromagnetic layer 210 at the bottom of the stroke (i.e., the gaps are equal on both sides). This may tend to maximize magnetic forces-both in latching and actuation—by minimizing the gaps in the magnetic circuit at either end of the stroke.

Similar to the stator assembly 232, the dimensions of the layers in the plunger assembly 234 are generally not constrained, and therefore may be determined based on the intended application of the electromechanical actuator 200. However, the permanent magnet 228, bottom ferromagnetic plate 226, and top ferromagnetic plate 230 may be designed while taking into account the stator assembly 232. For example, the permanent magnet 228, bottom ferromagnetic plate 226, and top ferromagnetic plate 230 should be designed such that (i) the top ferromagnetic plate 230 is able to move within a gap between the top surface of the middle ferromagnetic layer 214 and the bottom surface of the top ferromagnetic layer 216 and (ii) the bottom ferromagnetic plate 226 is able to move within a gap between the top surface of the bottom ferromagnetic layer 210 and the bottom surface of the middle ferromagnetic layer 214.

As can be seen in FIGS. 2A-2C, the chamber 236 may not be purely cylindrical. Instead, the layers of the stator assembly 232 and/or plunger assembly 234 may be sized and arranged such that the chamber 236 has structural features along its longitudinal sides that allow for improved control of the plunger assembly 234. Consider, for example, the embodiment shown in FIG. 2A. In this embodiment, the top ferromagnetic layer 216 extends across the entire perimeter of the stator assembly 232. Meanwhile, the middle and bottom ferromagnetic layers 214, 210 have the forms of annular cylinders (also called "coaxial cylinders"), where the central aperture corresponds to the chamber 236. These annular cylinders are defined by an inner radius that stretches from the central longitudinal axis 238 to the inner perimeter and an outer radius that stretches from the central longitudinal axis 238 to the outer perimeter. Similarly, each "coil stack" may be in the form of an annular cylinder. However, the inner radiuses of the "coil stacks" may not be the same as the inner radiuses of the middle and bottom ferromagnetic layers 214, 210. When the inner radiuses of the "coil stacks" are larger than the inner radiuses of the middle and bottom ferromagnetic layers 214, 210, structural features-commonly called "notches" or "shelves"—are formed, and these structural features can accommodate the top and bottom ferromagnetic plates 230, 226 as discussed above.

Overview of Principles of Operation

As mentioned above, the electromechanical actuator 200 can be driven by applying fixed pulses of current through the coils 212A-D.

To move the plunger assembly 234 from the first position to the second position, current is applied to the coils 212A-D such that the current flows in a first direction. When the plunger assembly 234 moves from the first position to the second position, downward movement may be impeded by any of (i) the mechanical resistance of the flexures 208, 222, (ii) the top ferromagnetic plate 230 contacting the top surface of the middle ferromagnetic layer 214, (iii) the bottom ferromagnetic plate 226 contacting the top surface of the bottom ferromagnetic layer 210, or (iv) the load 218 contacting the component at the end of its stroke.

To move the plunger assembly 234 from the second position to the first position, current is applied to the coils 212A-D such that the current flows in a second direction opposite the first direction. When the plunger assembly 234 moves from the second position to the first position, upward movement may be impeded by any of (i) the mechanical resistance of the outer and inner flexure regions 208, 222, (ii) the top ferromagnetic plate 230 contacting the bottom surface of the top ferromagnetic layer 216, or (iii) the bottom ferromagnetic plate 226 contacting the bottom surface of the middle ferromagnetic layer 214. Thus, upward movement may be impeded by the flexure reaching a limit of extension such that its restoring force prevents further axial motion, or upward movement may be impeded by the top ferromagnetic plate 230 or middle ferromagnetic layer acting as a physical barrier.

Figure 3:
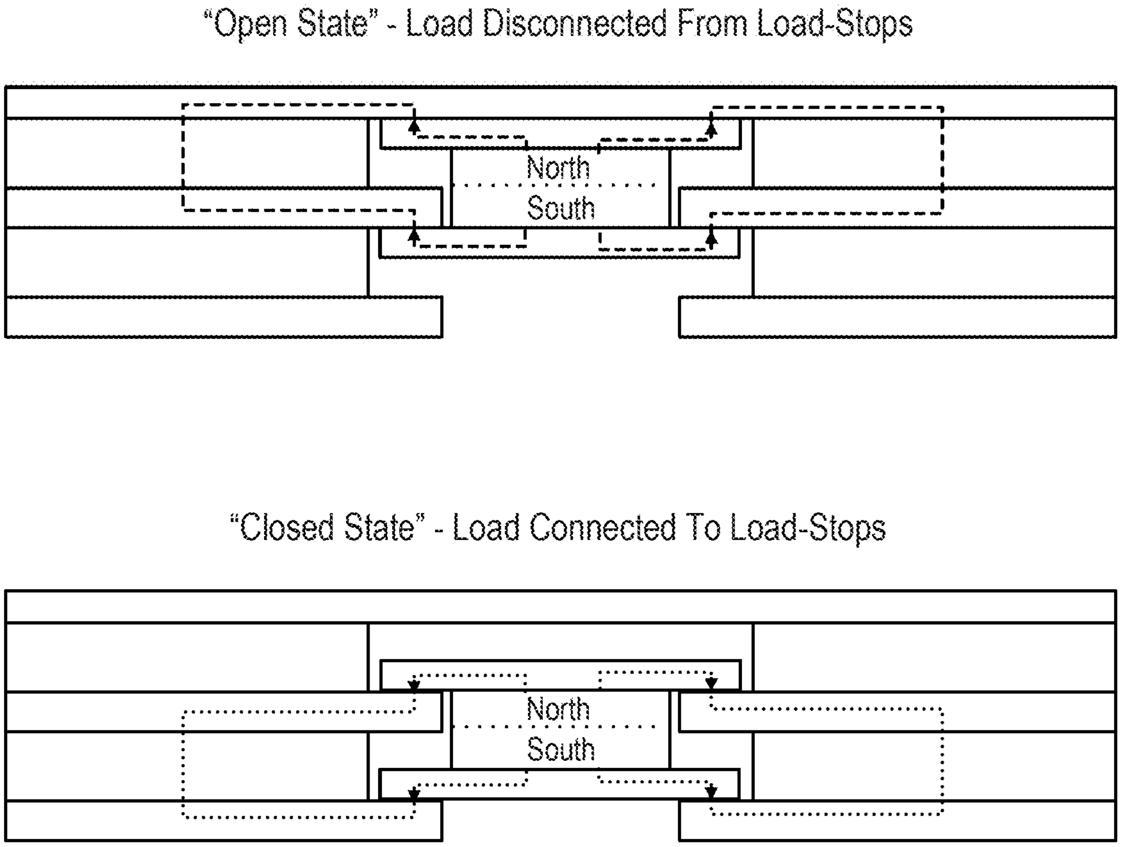
FIG. 3 includes a simplified diagrammatic illustration of the latching behavior of an electromechanical actuator caused by magnetic circuits in the "open position" and "closed position"

Accordingly, to actuate the plunger assembly 234, a fixed pulse of current obtained from a power source (not shown) can be applied to the coils 212A-D of the stator assembly 232, as such action magnetically polarizes the top, middle, and bottom ferromagnetic layers 216, 214, 210. A positive current may cause the plunger assembly 234 to move into the first position, thereby moving the load 218 to the "open" position. Conversely, a negative current may cause the actuator assembly 234 to move into the second position, thereby moving the load 218 to the "closed" position. FIG. 3 includes a simplified diagrammatic illustration of the latching behavior of an electromechanical actuator caused by magnetic circuits in the "open position" and "closed position." In FIG. 3, the dashed lines indicate magnetic flux in one magnetic circuit while the dotted lines indicate magnetic flux in another magnetic circuit. Magnetic flux in one direction-indicated using the dashed line-causes the electromechanical actuator to be "opened," while magnetic flux in the opposite direction-indicated using the dotted line-causes the electromechanical actuator to be "closed." Note that in FIG. 3, a portion of the plunger assembly is shown.

Note that while the load 218 may be described as being in the "open" position or "closed" position, those skilled in the art will recognize that these positions may simply be opposing end positions. Accordingly, the "open" position could also be called the "first end position" or simply "first position" while the "closed" position could also be called the "second end position" or simply "second position."

A. Magnetic Latching

An important aspect of the electromechanical actuator is its approach to actuation. Conventional electromechanical actuators may require that current be continuously applied in order to maintain a given state (e.g., the closed state). To avoid requiring that current be applied continuously for the electromechanical actuator to remain open or closed, the electromechanical actuator could instead be designed to "latch" in place whenever the state is switched. This is accomplished by designing the actuator to be magnetically bistable.

Referring to FIG. 2A, the spacing between the top, middle, and bottom ferromagnetic layers 216, 214, 210 in the stator assembly 232 can be matched to the spacing of top and bottom ferromagnetic plates 230, 226—and permanent magnet 228 and spacer 224—of the plunger assembly 234. The distance that the lines of the magnetic fields generated by the coils 212A-D pass through nonferrous material is minimized when the plunger is at its highest and lowest positions, this effect being maximized when the spacing is matched. This creates two local minima of magnetic reluctance (and therefore, potential energy) in these positions, causing the plunger to "latch" to its highest and lowest positions, magnetic "latching force" being maximized when the spacing is matched.

The size of the permanent magnet 228, thickness of the top and bottom ferromagnetic plates 230, 226, the vertical spring constant of the outer and inner flexure regions 208, 222, and distance between the highest and lowest positions can influence the latching force. To maximize the actuation speed, the net latching force (including magnetic and flexure contributions) can be minimized within the constraint set by vibration and impact resistance. Because the actuation force-which should be maximized to optimize switching speed—is largely determined based on the sum of magnetic latching force and vertical flexure force, the geometry of the flexure tends to be the easiest parameter to manipulate. Accordingly, choosing a flexure spring constant to set the "net latching force" at an appropriate value is typically preferred over redesigning or reselecting the permanent magnet 228 or top and bottom ferromagnetic plates 230, 226, or by using a larger distance (also called the "gap size").

B. Magnetic Actuation

Figure 4:
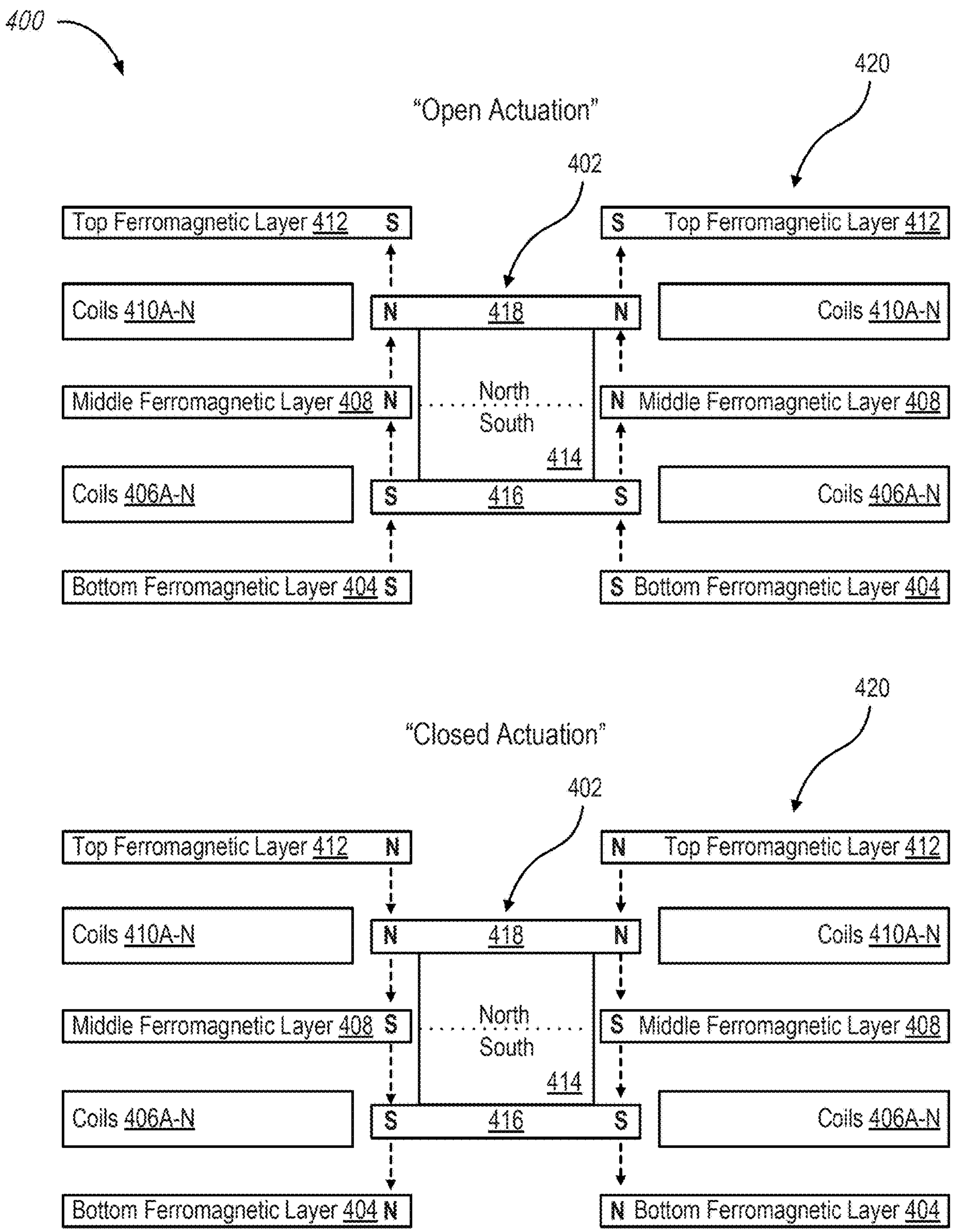
FIG. 4 includes a diagrammatic illustration showing how passing current through coils will result in an approximately constant magnetic force being applied to the plunger.

FIG. 4 includes a diagrammatic illustration showing how passing current through coils 406A-N, 410A-N will result in a constant magnetic force being applied to the plunger 402. In order to better show the magnetic force, the electromechanical actuator 400 has been "exploded" such that the various layers are separated and "expanded" such that the various layers are not drawn to scale.

As discussed above, the stator assembly 420 can include a trinity of ferromagnetic layers with coils situated therebetween, such that (i) at least one coil is situated between the bottom and middle ferromagnetic layers 404, 408 and (ii) at least one coil is situated between the middle and top ferromagnetic layers 408, 412. For example, a plurality of coils 406A-N may be situated between the bottom and middle ferromagnetic layers 404, 408, and another plurality of coils 410A-N may be situated between the middle and top ferromagnetic layers 408, 412. The first and second pluralities of coils 406A-N, 410A-N may include the same number of coils, or the first and second pluralities of coils 406A-N, 410A-N may include a different numbers of coils. Normally, each plurality of coils 406A-N, 410A-N includes at least two coils, though any number of coils could be situated between the bottom and middle ferromagnetic layers 404, 408 or between the middle and top ferromagnetic layers 408, 412. The thickness of each "coil stack" may depend on the size of the plunger 402, for example. The thickness of each "coil stack" tends to be proportional to the number of coils included therein.

The plunger 402 can include a permanent magnet 414 with ferromagnetic plates 416, 418 secured along its top and bottom poles. Here, for example, a bottom ferromagnetic plate 416 is connected along the bottom pole (i.e., south pole) of the permanent magnet 414, and a top ferromagnetic plate 418 is connected along the top pole (i.e., north pole) of the permanent magnet 414.

The top, middle, and bottom ferromagnetic layers 412, 408, 404 can be interleaved with the top and bottom ferromagnetic plates 418, 416 as shown in FIG. 4. The top ferromagnetic plate 418 can be situated between the top and middle ferromagnetic layers 412, 408, and the bottom ferromagnetic plate 416 can be situated between the middle and bottom ferromagnetic layers 408, 404.

As mentioned above, passing current through the coils 406A-N, 410A-N causes a constant magnetic force to be applied to the plunger 402 (and more specifically, to the top and bottom ferromagnetic plates 418, 416). This constant magnetic force is generally proportional to the current and the number of turns in the coils 406A-N, 410A-N. When this constant magnetic force overcomes the "latching force" of the plunger 402 (and more specifically, the permanent magnet 414), the plunger 402 will begin to move downward (e.g., toward the bottom ferromagnetic layer 404) or upward (e.g., toward the top ferromagnetic layer 412).

By applying a positive current to the coils 406A-N, 410A-N, movement in one direction (e.g., upward) can be achieved. Applying a negative current to the coils 406A-N, 410A-N may result in movement in the other direction (e.g., downward). For example, a positive current may cause the plunger 402 to move upward until the top ferromagnetic plate 418 contacts the bottom surface of the top ferromagnetic layer 412 and/or the bottom ferromagnetic plate 416 contacts the bottom surface of the middle ferromagnetic layer 408. When the plunger 402 is in this position, the electromechanical actuator 400 may be described as "open." Conversely, a negative current may cause the plunger 402 to move downward until the top ferromagnetic plate 418 contacts the top surface of the middle ferromagnetic layer 408 and/or the bottom ferromagnetic plate 416 contacts the top surface of the bottom ferromagnetic layer 404. When the plunger 402 is in this position, the electromechanical actuator 400 may be described as "closed."

Various parameters can influence this constant magnetic force, as well as the speed at which the plunger 402 is able to move between positions. These parameters include:

- Thickness and composition of the top, middle, and bottom ferromagnetic layers 412, 408, 404.
- For example, thickness of the top, middle, and bottom ferromagnetic layers may be 25-325 μm.
- Thickness and grade of the permanent magnet 414.
- For example, thickness of the permanent magnet 414 may be 0.2-0.5 mm.
- Number of turns of the coils 406A-N, 410A-N.
- Magnitude of current applied to the coils 406A-N, 410A-N.
- Diameters of the coils 406A-N, 410A-N and permanent magnet 414.
- Spacing between, and overlap with, the top, middle, and bottom ferromagnetic layers 412, 408, 404, as the spatial relationship impacts the direction of the magnetic field gradient.

In operation, current is applied to the coils 406A-N, 410A-N. When this happens, the coils 406A-N, 410A-N produce magnetic fields in opposite directions, so as to induce poles in the top, middle, and bottom ferromagnetic layers 412, 408, 404. Depending on the direction of the current, the inner poles of the top, middle, and bottom ferromagnetic layers 412, 408, 404 may be an N-S-N configuration or S-N-S configuration. The permanent magnet 414 has two fixed poles. Here, for example, the permanent magnet has an N-S configuration. Therefore, when the top, middle, and bottom ferromagnetic layers 412, 408, 404 are magnetically polarized, all of the inner poles of the stator assembly 420 will push or pull the plunger 402 in the same direction. Reversing the direction of the current will reverse the direction in which the inner poles of the stator assembly 420 push or pull the plunger 402. FIG. 4 illustrates how applying current to the coils 406A-N, 410A-N can induce magnetic polarization that causes magnetic forces to be applied to the plunger 402.

Figure 5A:
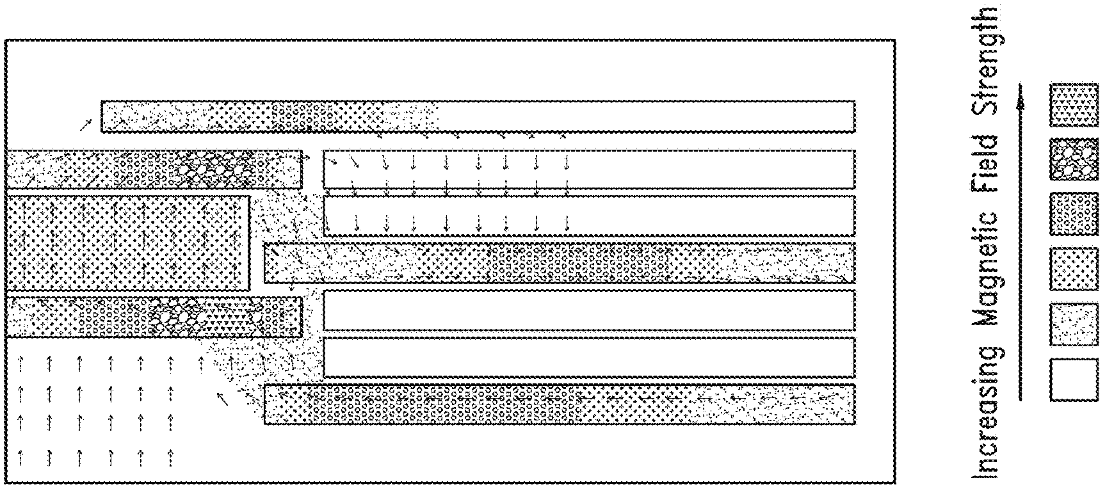
FIGS. 5A-5E illustrate the magnetic flux in a plunger assembly that is moving from the first position to the second position and then returning to the first position.
Figure 5B:
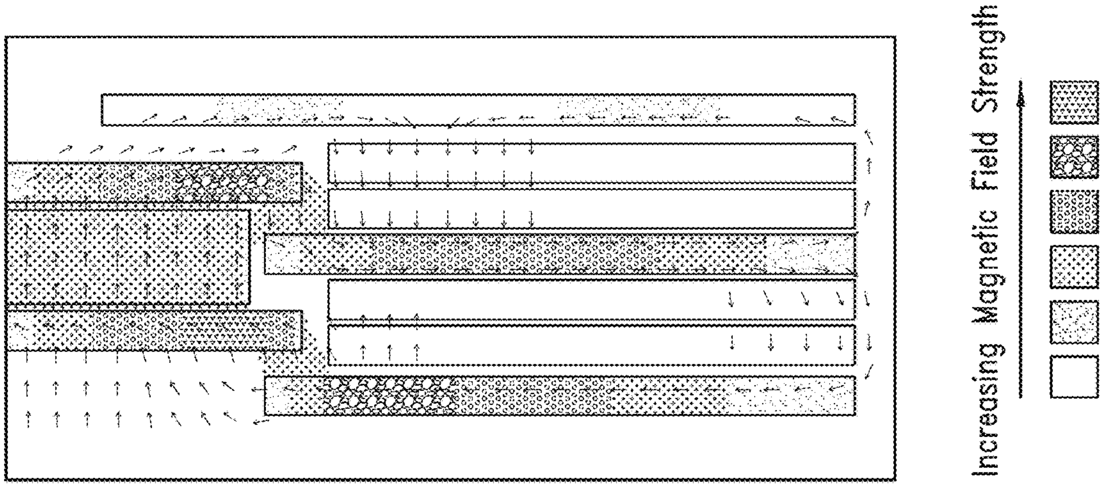
Figure 5C:
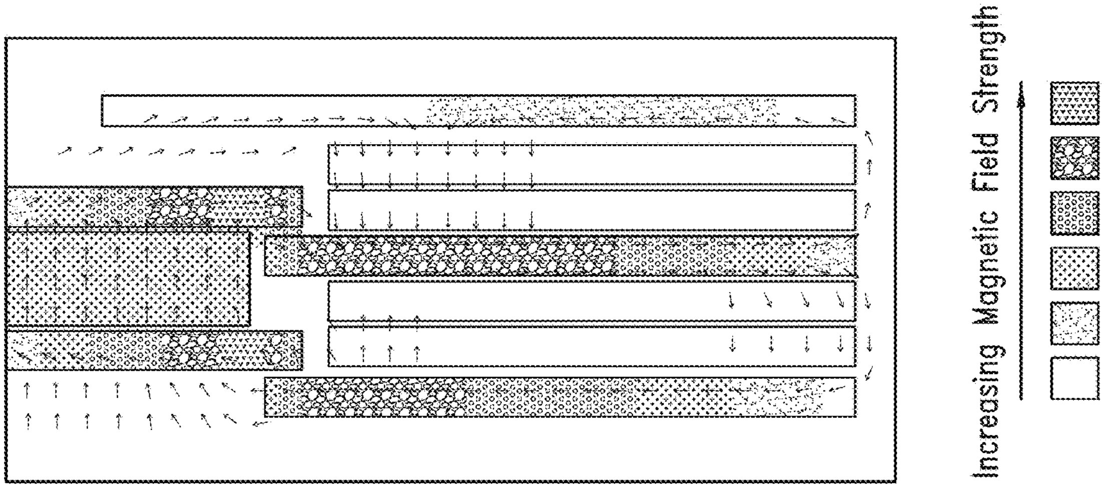
Figure 5D:
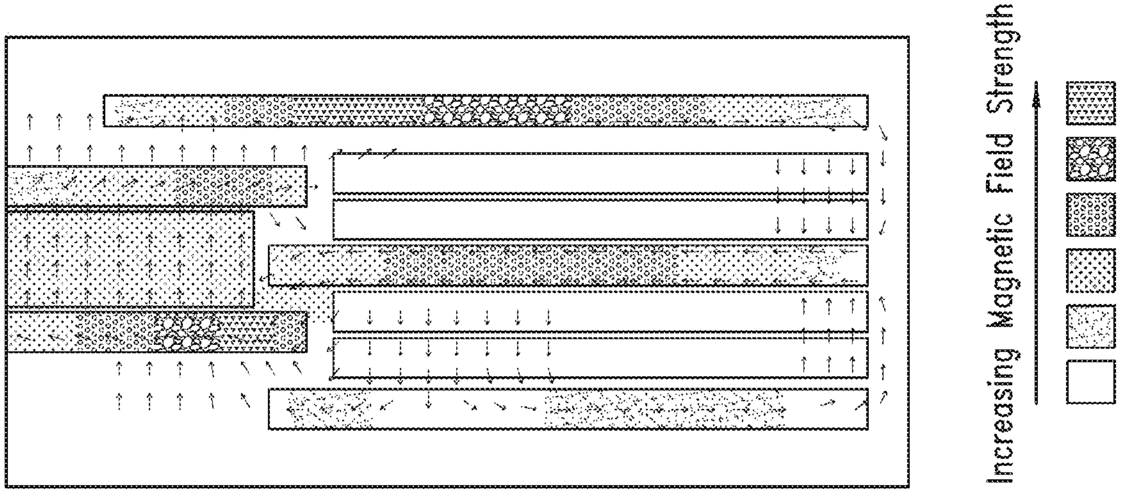
Figure 5E:
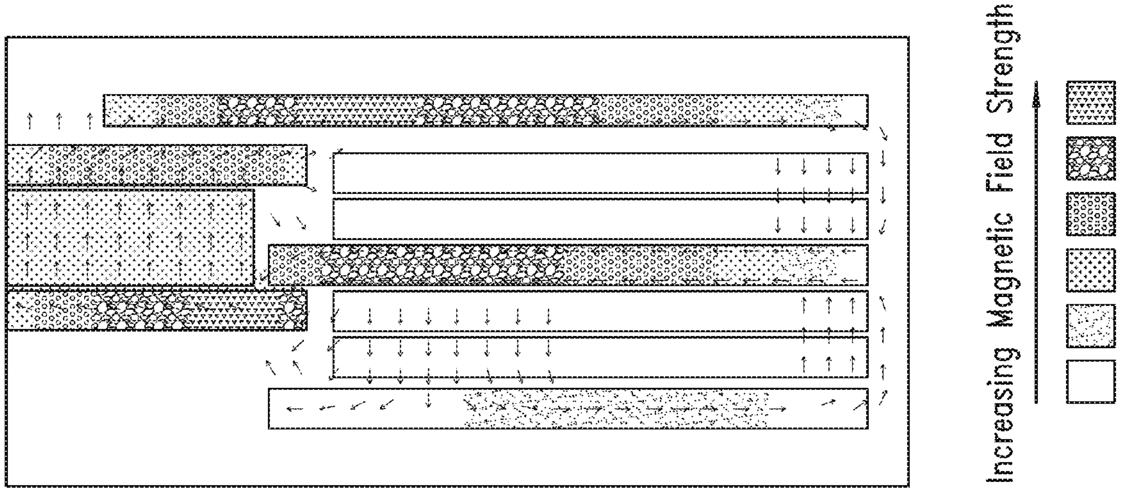

FIGS. 5A-5E include visualizations that illustrate the magnetic field strength and direction as the plunger assembly is moved between the first and second positions. Specifically, FIG. 5A illustrates the plunger assembly in the first position. In order to move the plunger assembly into the second position, a fixed pulse of positive current can be applied to the coils, so as to magnetically draw the plunger assembly downward. FIG. 5B illustrates the plunger assembly as it is moving toward the second position, while FIG. 5C illustrates the plunger assembly in the second position. In order to move the plunger assembly back into the first position, a fixed pulse of negative current can be applied to the coils, so as to magnetically draw the plunger assembly upward. FIG. 5D illustrates the plunger assembly as it is moving toward the first position, while FIG. 5E illustrates the plunger assembly back in the first position.

C. Constrained Motion and Flexures

Flexures (e.g., flexures 208, 222 of FIG. 2A) can be used to keep the plunger assembly centered within the chamber of the stator assembly, to ensure that movement is largely, if not entirely, vertical along a central longitudinal axis. Further, these flexures can inhibit or prevent friction between the various layers of the plunger assembly and stator assembly. To accomplish this, the flexures may need to have a stiffness with respect to lateral motion of at least the maximum lateral magnetic force—making worst-case assumptions for geometry within manufacturing tolerances—divided by the worst-case clearance within manufacturing tolerances.

To ensure that the load (e.g., load 218 of FIG. 2A) is able to sit flat along the top surface of the load-stops (e.g., load-stops 204A-B of FIG. 2A), the maximum lateral asymmetry in flexure force may be less than the remaining closed-side latching force after any force applied by the flexures is considered.

Figure 6:
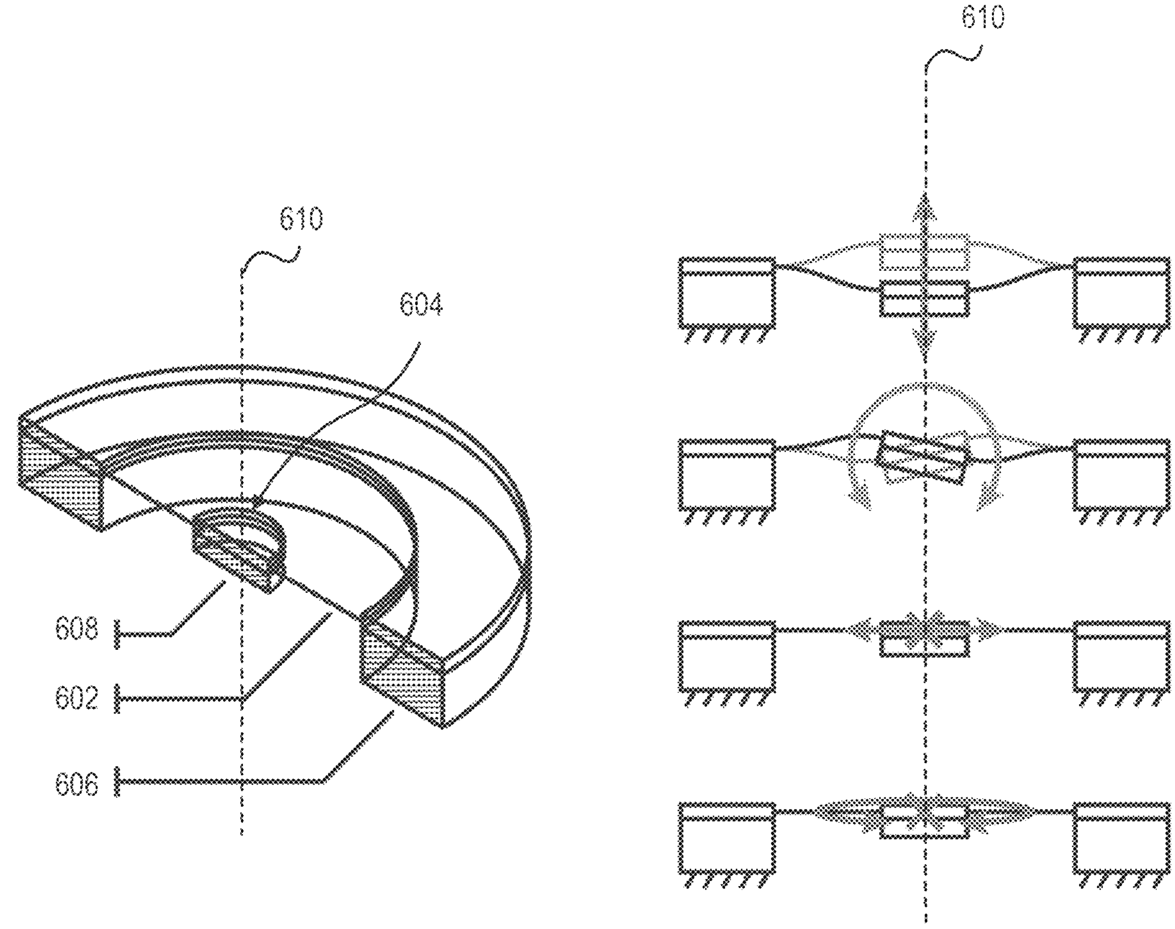
FIG. 6 includes a perspective, section view that illustrates how a flexure connected to a plunger assembly can constrain movement of the plunger assembly with respect to a stator assembly.

FIG. 6 includes a perspective, section view that illustrates how a flexure 602 connected to a plunger assembly 604 can restrict movement of the plunger assembly 604 with respect to a stator assembly 606. To ensure that the flexure 602 is appropriately positioned, the flexure 602 may be "sandwiched" between layers in the plunger assembly 604 and/or the stator assembly 606. For example, the flexure 602 may be interposed between ceramic layers.

For simplicity, only some components of the plunger and stator assemblies 604, 606 are shown in FIG. 6. Specifically, FIG. 6 shows how the flexure 602 can ensure that movement of the load 608 is substantially vertical or longitudinal, namely, along a longitudinal axis 610. While some degree of tilt may occur, the plunger assembly 604 will not experience any meaningful horizontal or lateral movement, nor will the plunger assembly 604 experience any meaningful rotation about the longitudinal axis.

As can be seen in FIG. 6, such an approach to guiding movement of the plunger assembly 604 not only allows for repeated movement with a high degree of consistency, but also avoids any friction from the plunger assembly 604 contacting the internal wall of the stator assembly 606. This friction can lead to poor and/or unreliable performance, and therefore avoiding this friction is important.

Packaging and Internal Environment

Implementations of the electromechanical actuator may benefit from being hermetically sealed to prevent ingress or egress of fluids (e.g., gasses and liquids) from the ambient environment into the chamber of the stator assembly or from the chamber of the stator assembly to the ambient environment.

In addition to being hermetically sealed, embodiments of the electromechanical actuator could be evacuated or have an insulating fluid deposited or injected therein. For example, the chamber defined within the stator assembly may be filled with a chemically inert, electrically insulating gas that is either above one atmosphere in pressure or below one atmosphere in pressure, or the chamber may be filled with a chemically inert, electrically insulating liquid that is either above one atmosphere in pressure or below one atmosphere in pressure. If used in an electromechanical relay, the chamber may be filled with the insulating fluid to provide sufficient dielectric standoff for a given stroke length of the plunger assembly. Having an atmospheric pressure in excess of one atmosphere will also result in a pressure bias being applied across any leakage paths through the hermetic envelope, thereby inhibiting or preventing ingress or egress of atmosphere into the chamber or from the chamber of the stator assembly to the ambient environment. Liquids in the chamber may be electrically insulating or conductive depending on the application. A liquid may serve as a means of transmitting hydraulic force, or to provide dielectric breakdown resistance.

Generally, the insulating fluid is a chemically inert, electrically insulating gas that is comprised entirely or primarily of nitrogen. However, nitrogen could be mixed with one or more other electrically insulating gasses, for example, to improve arc resistance (as may be useful for an electromechanical relay). Other fluids could be used, however. For example, the insulating fluid may be another chemically inert, electrically insulating gas such as argon, or the insulating fluid may be a chemically inert, electrically insulating liquid such as hexamethyldisiloxane or octamethyltrisiloxane, which are low molecular weight, low viscosity silicones.

Design Selection

Because the actuation force is proportional to acceleration, the total initial force at the beginning of a "stroke" disproportionately determines the time required to switch from one state to another state. Note that the total initial force can be broadly characterized by the sum of the latching force, actuation force, and flexure force. To maximize the force at the beginning of a "stroke," the flexure can be used like a spring to offset the latching force. With the latching force partially, if not entirely, offset, the total initial force can instead be characterized by the sum of the actuation force and flexure force.

Approaches to Designing and Manufacturing Electromechanical Actuators

Figure 7:
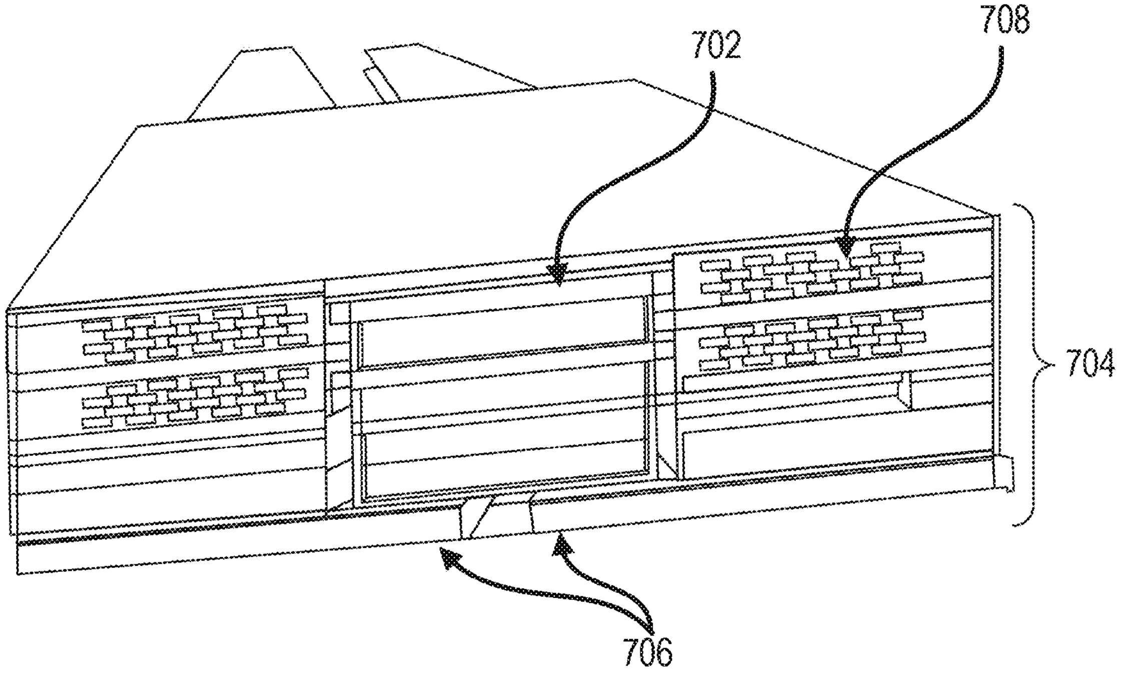
FIG. 7 includes a section view diagrammatic illustration of the plunger assembly, contact assembly, and stator assembly.

To design an electromechanical actuator in accordance with the embodiments disclosed herein, it is easiest to consider the electromechanical actuator as a combination of two components, namely, (i) a stator assembly that has a chamber partially defined therethrough along a central longitudinal axis and (ii) a plunger assembly that is situated in the chamber of the stator assembly and, in operation, moves along the central longitudinal axis between a first position and a second position. At a high level, the stator assembly includes two subcomponents, namely, (i) a contact assembly and (ii) a drive electromagnetics assembly. FIG. 7 includes a diagrammatic illustration of the plunger assembly 702 and stator assembly 708 of the relay 704. As discussed above, the stator assembly 708 facilitates actuation of the plunger assembly 702 by generating magnetic fields when current is applied thereto. Actuation of the plunger assembly 702 results in its bottommost surface either engaging or disengaging the load-stops 706, which in a relay are the contacts.

Figure 8:
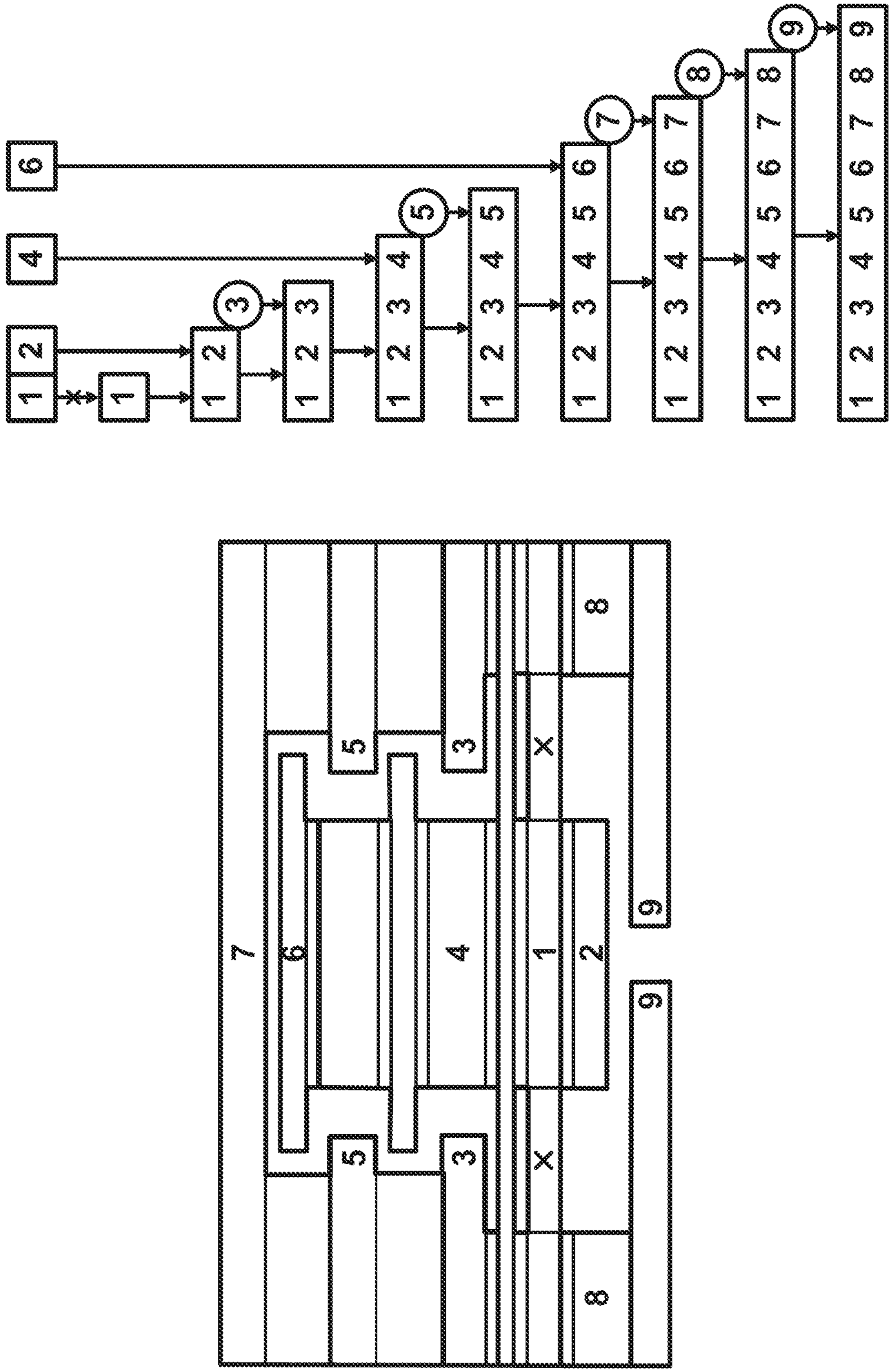
FIG. 8 includes a section view of the electromechanical actuator, as well as a diagrammatic illustration of a possible assembly sequence.

Fabrication of an electromechanical actuator requires the separate fabrication of its subcomponents. FIG. 8 includes an illustration of a set of steps that could be used to assemble the relay 200 as a collection of layers. Note that, for convenience, reference may be made to components discussed with reference to FIGS. 2A and 2B. The order of assembly is important as the flexure layer represented by flexure regions 208, 222 that are part of the same flexure is included in both subassemblies. Furthermore, the interlocking aspect of the ferromagnetic layers requires the plunger assembly to be assembled in place as the plunger assembly 234 cannot be inserted through the opening in the middle ferromagnetic layer 214 after the plunger assembly 234 has been assembled. For the purpose of illustration, one possible order of assembly as illustrated in FIG. 8 is as follows:

Step 1: Start with spacer 1 (220 in FIG. 2A) that is rigidly connected between the plunger assembly 234 and stator assembly 232 by removable tabs marked with 'x.'

Step 2: Load 2 is laminated to the spacer 1.

Step 3: Bottom ferromagnetic layer 210 is laminated to the assembly produced in Step 2.

Step 4: Spacer 224 of the plunger assembly 234, bottom ferromagnetic plate 226, and permanent magnet 228 are laminated into the opening left inside of the bottom ferromagnetic layer 210.

Step 5: First set of coils 212A-B and middle ferromagnetic layer 214 are laminated to the assembly produced in Step 4.

Step 6: Top Ferromagnetic plate 230 is laminated to the top of the permanent magnet 228.

Step 7: Second set of coils 212C-D and top ferromagnetic layer 216 are laminated to the top of the assembly produced in Step 6.

Step 8: Spacer layer 206 is laminated to the bottom of the assembly produced in Step 7. Then, the tabs connecting the inner and outer portions of spacer 220 (x) applied in Step 1 are removed to free the motion of the plunger assembly 234 as constrained by the flexure—collectively represented by 208 and 222.

Step 9: Assembly produced in Step 8 is placed atop the load-stops 204A-B. The load-stops 204A-B may be laminated or clamped in place below the assembly.

Those skilled in the art will recognize that other orders of assembly are possible and, in some embodiments, may be desirable based on the speed or precision with which the electromechanical actuator 200 is to be assembled.

Figure 9:
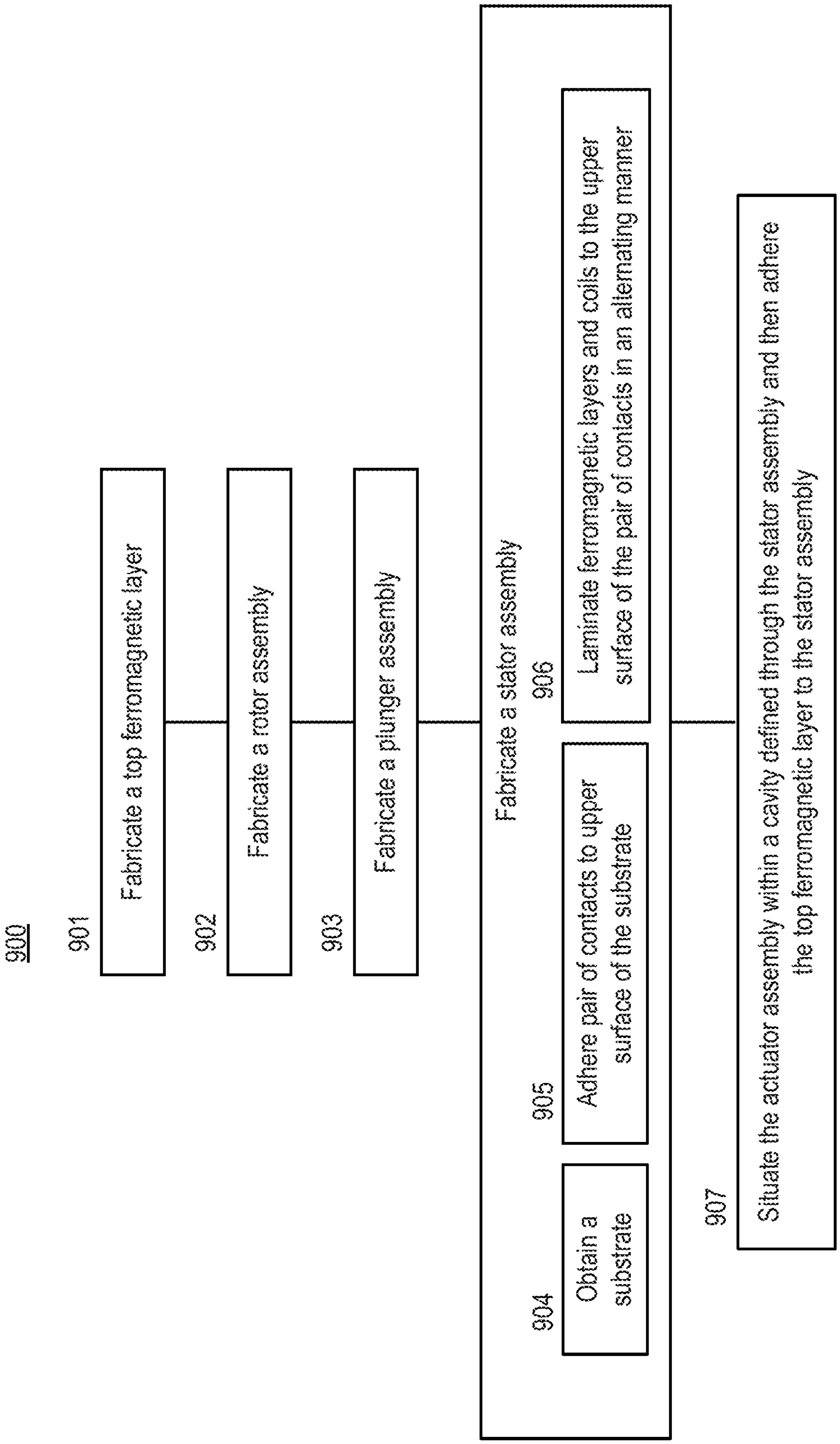
FIG. 9 includes a high-level diagram of a process for fabricating an electromechanical actuator.

FIG. 9 includes a high-level diagram of a process 900 for fabricating an electromechanical actuator in accordance with another aspect of the present disclosure. Again, for convenience, reference may be made to components discussed with reference to FIG. 2A. However, FIG. 9 is specific to the design of an electromechanical actuator that does not include a flexure connecting the stator assembly and plunger assembly. Initially, a manufacturer can fabricate a top ferromagnetic layer (step 901), for example, by cutting a single layer from a piece of ferromagnetic material (e.g., steel). Then, the manufacturer can fabricate a plunger (step 902). For example, the manufacturer may create or acquire a permanent magnet and then layer ferromagnetic plates along its top and bottom poles. These ferromagnetic plates may be called the “top ferromagnetic plate” and “bottom ferromagnetic plate,” respectively. Thereafter, the manufacturer can fabricate the plunger assembly (step 903) by laminating, adhering, or otherwise connecting a spacer and load to the bottom ferromagnetic plate. Note that additional layers could be included in the plunger assembly.

To fabricate the stator assembly, the manufacturer can obtain a substrate (step 904), adhere the component with which the load interacts to the upper surface of the substrate (step 905), and then laminate ferromagnetic layers and coils to the upper surface of the pair of contacts in an alternating manner (step 906). Generally, the ferromagnetic layers and coils are laminated such that the resulting electromechanical actuator includes a trinity of ferromagnetic layers with one or more coils situated between the first and second ferromagnetic layers and another one or more coils situated between the second and third ferromagnetic layers. In some embodiments the lowermost ferromagnetic layer is laminated directly adjacent to the pair of contacts, while in other embodiments there are one or more intervening layers as shown in FIG. 2A.

To create the electromechanical actuator, the manufacturer can situate the plunger assembly within a cavity defined through the stator assembly and then adhere the top ferromagnetic layer to the stator assembly (step 907). Adhering the top ferromagnetic layer to the stator assembly causes a fully enclosed chamber to be defined inside the stator assembly. As discussed above, in operation, the plunger assembly is able to move between different positions inside the fully enclosed chamber.

It is to be understood that the foregoing actuator may be used alone or in combination with either one of the following alternative micromachined contacts in accordance with the present disclosure. The first contact implementation utilizes an array of micromachined flexures on one of the contact members, and the second contact implementation utilizes a liquid-solid interface between contact members. These are described in this order below.

Electrical Contacts Using an Array of Micromachined Flexures

In accordance with another aspect of the present disclosure, a structure is provided for minimizing the required force on a switch contact to achieve a desired (low) contact resistance. Inelastic deformation that causes two surfaces to conform will by definition require higher forces than elastic deformation because the inelastic deformation yield point is always beyond the elastic deformation limit.

Using a multitude of elastic spring flexures (“fingers”) to form a compound contact allows the individual contacts to conform to the mating side without lifting the surrounding fingers off the surface, thus allowing all or at least most fingers to make contact.

The available contact force is divided up over the sum of the fingers based on the amount of travel each finger needs to accommodate. A desirable improvement to the scheme is to make the individual spring elements constant-force or at least non-linear to better equalize the forces experienced by each spring element.

Multi-finger contacts may be fabricated using micromachining techniques including wire Electric Discharge Machining (EDM) and laser micromachining using femtosecond lasers. Contacts may be fabricated from metallic materials including copper, beryllium copper, and other conductors.

Figure 10B:
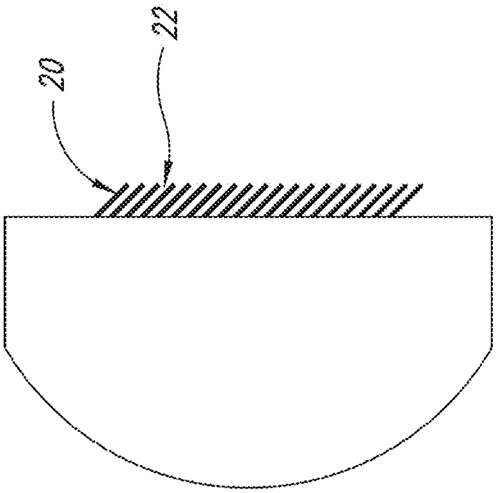
FIGS. 10A and 10B are illustrations of a contact array formed in accordance with the present disclosure.
Figure 10A:
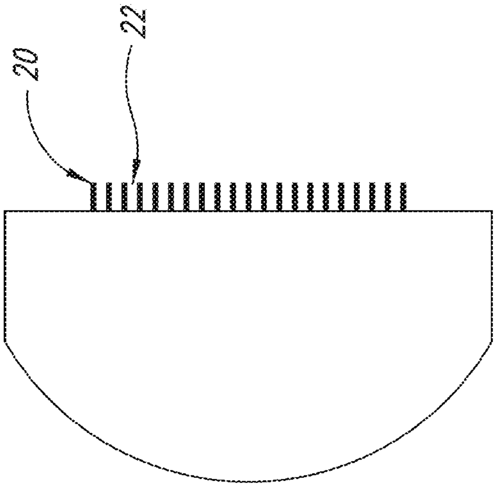
Figure 13:
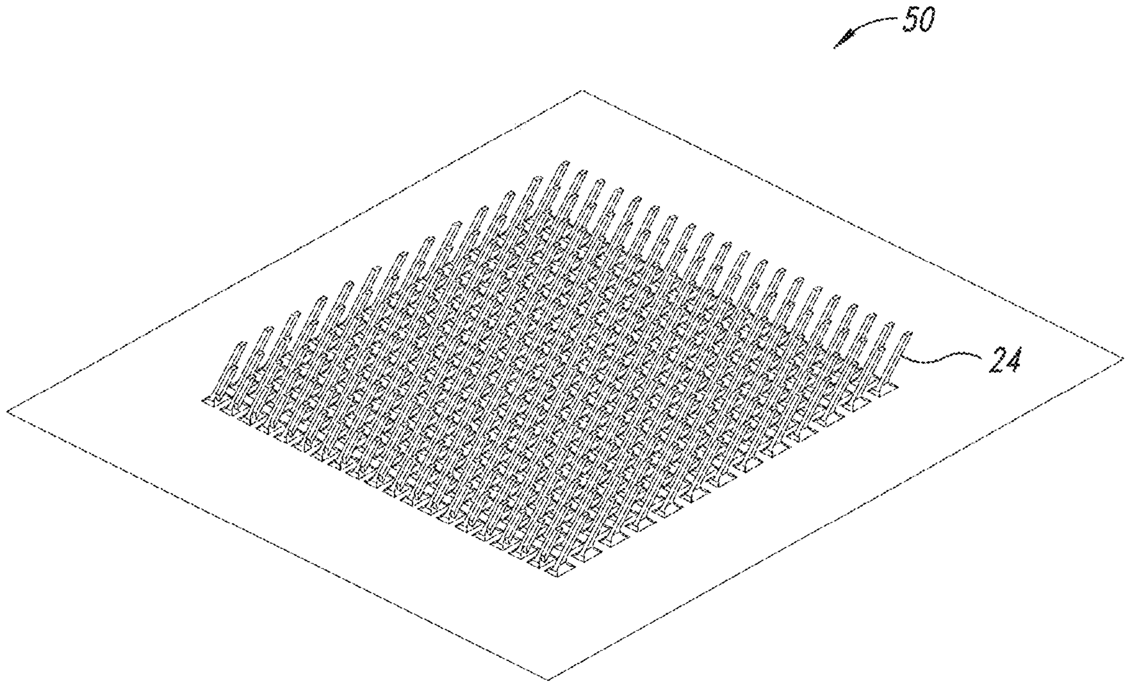
FIG. 13 illustrates an array of flexures formed in accordance with the present disclosure.

The plurality of electrically conductive flexures may be formed from a laser micromachining process. Alternatively the plurality of electrically conductive flexures may be formed from an additive manufacturing process, or the plurality of electrically conductive flexures may be formed of carbon nanotubes grown upon a base surface Flexible cantilever finger structures are cut at an angle to the contact base surface. The fingers may be cut in a rectangular array or in a linear array or in other patterns such as hexagonal or circular arrangements of flexures. FIGS. 10A and 10B are illustrations of an array of 13×20=260 fingers, with only 21 fingers 20 shown. FIG. 10A shows a set of vertical cuts (gaps 22) made by a machining tool. FIG. 10B shows angled fingers 20 formed with an orthogonal set of cuts (gaps 22) made at a 45-degree angle. The result would be an array 50 as shown in FIG. 13, which could be composed of 260 fingers 24. Each finger 20, 24, if micromachined, has a preferred dimension in the range of 3 microns by 3 microns to and including 100 microns by 100 microns, with gaps 22, 26 in the range of 10 microns to and including 200 microns between each row of fingers 20, 24. If the fingers 20,24 are formed by growing carbon nanotubes then the preferred dimensions would be in the range of 0.4 nanometers to 100 nanometers in diameter and the spacing would be in the range of 1 to 10 nanometers between fingers.

As electromechanical relays reduce in size, the force available to press the contacts together becomes smaller due to reduced volume for magnetic material and for current-carrying conductors in the electromagnetic actuator. The available force is divided amongst all the contacts in the array. It can be shown that the electrical resistance of an array of N flexures with a given total normal force and given total contact area is proportional to 1/(square root N). Thus, a contact with a 10-by-10 array of fingers will have 100 contacts and $1/10^{th}$ the resistance of a single contact compressed with the same total force. See "Contact Flexure Array Scaling Mathematical Analysis" further below for a mathematical derivation of this result.

Figure 11A:
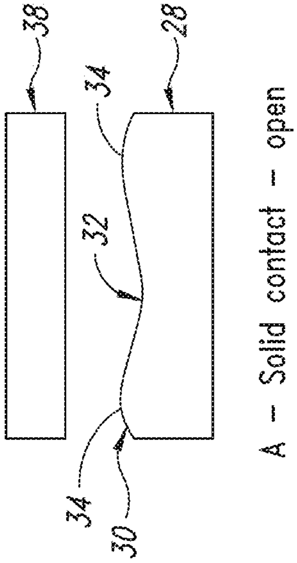
FIGS. 11A and 11B are illustrations of the operation of a conventional contact.
Figure 12A:
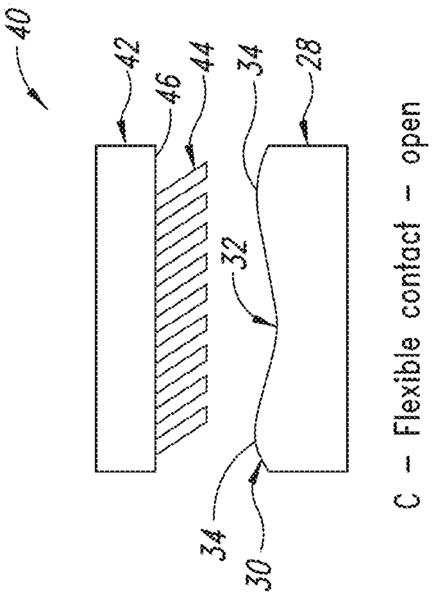
FIGS. 12A and 12B illustrate the construction and operation, respectively, of a contact using the contact array of FIG. 10B in accordance with the present disclosure.
Figure 11B:
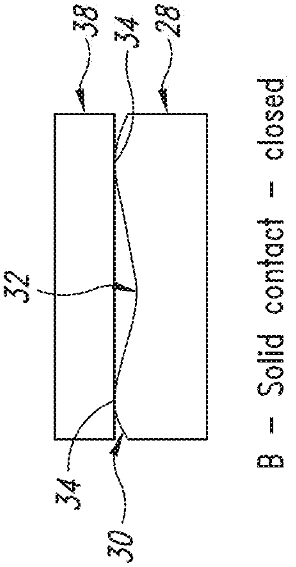
Figure 12B:
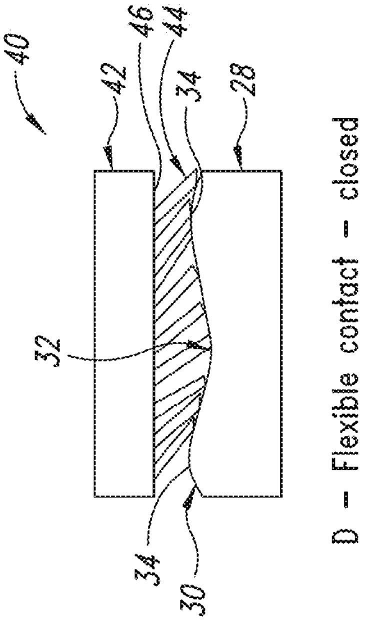

FIGS. 11A-11B illustrate a conventional contact structure and FIGS. 12A-12B illustrate how a contact structure of the present disclosure works. Each of the four views in FIGS. 11A-11B and FIGS. 12A-12B shows an identical rigid lower contact member 28 that has an undulating upper surface 30, which forms a valley 32 between two asperities 34 or high points. For the purpose of illustration the undulations in the surface are exaggerated in the figures. Note that the undulations in the figure do not represent intentional features of the contact, but rather inadvertent artifacts left behind by the fabrication or wear of the contact material. In FIGS. 11A-11B, a traditional solid contact 38 is shown in open and closed states, respectively.

In operation, the solid moveable upper contact member 38, shown in FIG. 11A positioned above the lower contact member 28, makes contact with the lower contact member 28 as shown in FIG. 11B, but only on the two asperities 34 or high points on the lower contact member 28. This limits the surface area available for electrical contact and resulting conduction. In a traditional relay or switch, the solution to this problem is to apply more force to the upper contact member 38. With adequate force, the upper contact member 38 or lower contact member 28 will plastically deform, which will provide a larger surface contact with the lower contact member 28 and therefore lower resistance.

Referring next to FIGS. 12A-12B, shown therein is a novel flexible contact array device 40 formed in accordance with the present disclosure. The lower contact member 28 previously described is shown positioned below an upper contact member 42 formed in accordance with the present disclosure. In FIG. 12A the upper contact member 42 is in an open position and in FIG. 12B the upper contact member 42 is in a closed position. The upper contact member 42 has multiple flexures, also referred to herein as fingers, 44 extending from a lower surface 46. As shown in FIG. 3A, the fingers 44 are in a relaxed, straight position and not in contact with the lower contact member 28.

As the contact 40 is closed by moving the upper contact member 42 towards the lower contact member 28 to be in a closed position, the fingers 44 bend as they move into contact with the upper surface 30 of the lower contact member 28. With the fingers 44 in contact with the highest asperity 34 on the lower contact member 28, and bending the most compared to the fingers 44 in contact with the lowest point in the valley 32, the total force required to bend the fingers 44 is much lower than the total force required to plastically deform the upper contact member 38 in the typical contact design. The number of contact points when the contact 40 is in the closed position shown in FIG. 12B is now equal to the number of fingers 44 in contact with lower contact member 28. In this closed position the lower surface 46 of the upper contact member 42 is positioned a first distance from the lowest point 32 of the upper surface 30 of the lower contact member 28. This first distance includes a separation distance between the highest asperity 34 and the lower surface 46 of the upper contact member 42, which is shorter than the first distance.

Ideally, all of the plurality of electrically conductive fingers 44 extending from the upper contact member 42 have an identical height or distance from the contact base surface (lower surface 46) of the upper contact member 42. This distance is greater than a sum of a first distance between the high points 34 and the low points 32 on the exposed upper surface 30 of the lower contact member 28 and a separation distance between the lower surface 46 of the upper contact member 42 and the highest of one or more high points 34 of the upper surface 30 on the lower contact member 28 when the upper contact member 42 is in the closed position.

The reduced contact force requirement of this flexure array design is a key enabler for the use of small, relatively weak electromagnetic actuators to achieve low resistance contacts.

Micro-machining (laser) or EDM (Electric Discharge Machining) can be used to create an array of tilted cantilever spring flexures from a solid conductor. This allows the use of an arbitrarily thick base material with the best possible conduction path since no additional bonding is required. The spring geometry and material can be optimized to give the lowest contact resistance for a given set of normal forces and range of compliance (surface unevenness). The springs or fingers 44 can be coated after they are machined to improve resistance to oxidation, or to provide other beneficial characteristics such as reducing friction at the contact surface or providing a soft material at the tip to increase the degree of plastic deformation where the flexure makes contact with the opposing contact. Spring flexures may be formed with a variety of shapes beyond simple tilted cantilevers, including S-shaped springs, helical springs, buckling springs, or any shape of structure which will deform elastically under a force normal to the main contact surface. Such flexures may be formed using a variety of processes including 3D printing using metals or plated polymers, photochemical etching, reactive ion etching, or deposition or growth of carbon nanotube structures.

As will be readily appreciated from the foregoing, the present disclosure provides a contact structure that provides for the creation of lower-resistance contact members when only low normal forces are available. This is of particular interest in miniature relays or for general relays that need to be optimized for low power in the coil drive.

Figure 14:
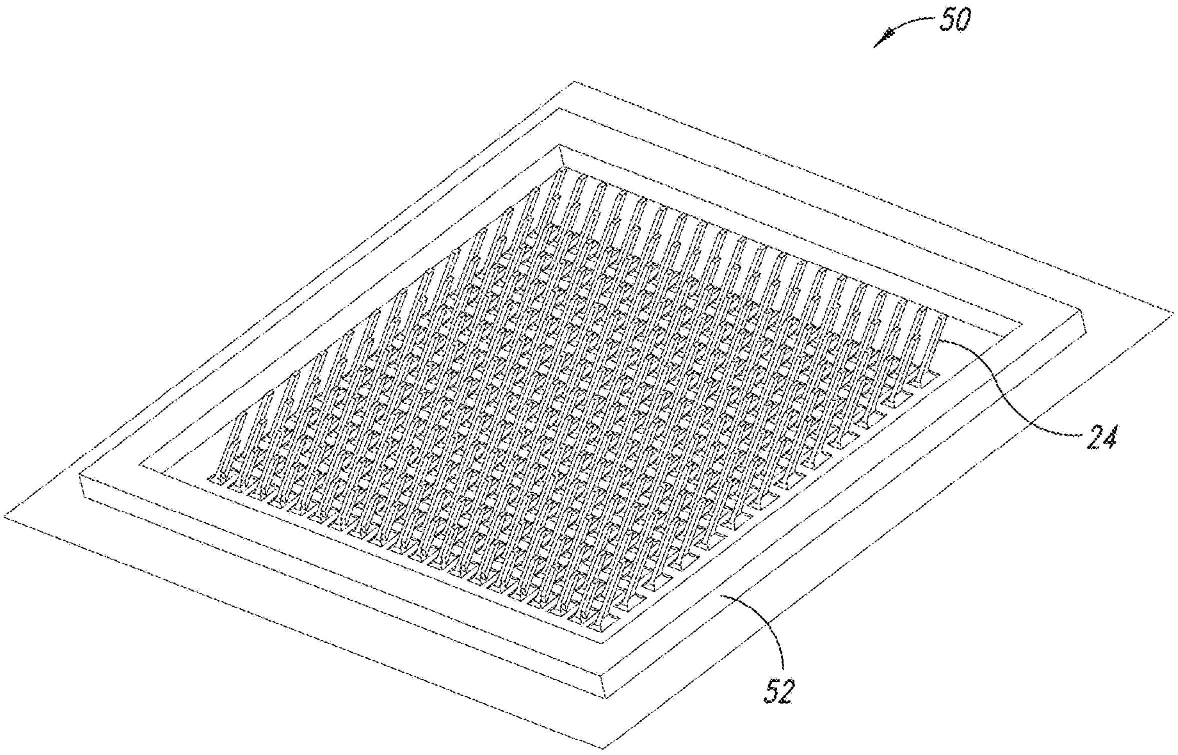
FIG. 14 illustrates the array of flexures of FIG. 13 to include a circumscribing hard stop feature in accordance with the present disclosure.

The fingers may be damaged if they are bent too far by excess pressure. The geometry of the contact may be modified to provide a hard stop, which will control the maximum degree of bending of the fingers. This hard stop may be formed on either of the two contacts members, or to some degree on both contact members. The hard stop may take the form of a wall 52 surrounding the array 50 of fingers 24, but lower in overall height than the fingers 24, as shown in FIG. 14. The hard stop may also be formed as a non-continuous set of rigid structures. The height of the hard stop may be optimized to permit an ideal degree of deformation of the flexures.

Contact Flexure Array Scaling Mathematical Analysis

Upper-Bound CFA Resistance vs. Number Scaling Analysis

Assumptions:

1. Equal load-sharing of total contact array force ("F") over all ("n") contact flexures resulting in a force of F/n per individual contact.
2. Array of "n" contact flexures distributed over a fixed area (foot-print) "A."
3. Effective conductor area is a fixed fraction ($f_a$) of the foot-print area (A/n).
4. Actual electrical contact area for each flexure is controlled by Hertzian elastic contact mechanics or the plastic deformation area vs. force approximation [2].
5. Each contact is arranged in parallel with one another.

CFA Resistance Calculation

Individual Contact Spreading Resistance [1]:

$$R_s = \frac{\rho}{2\cdot b}\left[1 - c_1\cdot\left(\frac{b}{a}\right)^1 + c_2\cdot\left(\frac{b}{a}\right)^2 + c_3\cdot\left(\frac{b}{a}\right)^3 + c_4\cdot\left(\frac{b}{a}\right)^4\right]$$

$$a = \left(\frac{f_a\cdot A}{\pi\cdot n}\right),$$

$$b = \left(\frac{F}{H_p\cdot n}\right)^p$$

where $R_s$, electrical resistance of flexure contact area

ρ, flexure resistivity a, effective flexure cross-sectional radius b, effective contact radius $c_i$, equation fitting constants $f_a$, flexure cross-sectional shape factor relating area to effective radius A, total area (foot-print) of flexure array n, number of flexures p, asperity contact force–area exponent (=⅓ elastic asperities, =½ plastic asperities)

F, total force on flexure array $H_p$, elastic or plastic asperity parameter

For the most important case of plastically deformed asperities, the total contact resistance of the array (excluding the bulk resistance of the individual flexures) scales as $1/\sqrt{n}$, the inverse of the square-root of the number of flexures; more contacts means lower resistance for any given total array force and total array foot-print area.

Stabilized Liquid-Solid Electrical Contact

It has been found that wetting one or both switch contacts with a conductive fluid provides improved surface contact with minimal force. Depending upon the surface energy (or surface tension) of the liquid-solid, liquid-vapor, and solid-vapor interfaces, a liquid-solid contact interface may support a liquid film of finite static thickness (repelling or non-wetting case) or tend to zero thickness at a finite number of interface points (attractive or wetting case). Both phenomena may be exploited to obtain advantageous electrical contact properties. However, existing solutions for liquid contacts come with their own sets of problems. The liquid should ideally have both high thermal and electrical conductivity, be preferentially metallically bonded, and operate over a wide temperature range including room temperature. This can be achieved by using liquid metals. Other classes of conductive fluids, such as ionic liquids, do not satisfy several of these requirements including their conductivity, which is orders of magnitude lower than liquid metals. Mercury, a liquid metal at room temperature, was used as a switch in thermostats until its toxicity became apparent.

Other liquid metals, such as sodium-potassium (NaK), gallium, and gallium alloys are less toxic, but they may react with most metals and therefore are not necessarily reliable as wetted contacts. "Galinstan®" is a particular near-eutectic alloy of gallium, indium, and tin with a freezing point of −19° C. and a boiling point of 1300° C. Gallium is known to react to form intermetallic phases with a wide range of metals, which threatens the stability of a solid metal electrode surface. For example, copper is a common electrode material because of its superior electrical conductivity, but intermetallic crystals form with gallium at temperatures just barely above room temperature. This persistent reactivity renders the contact interface compromised because: (a) gallium is depleted from the Galinstan alloy, which alters its chemical composition and raises its liquidus temperature (e.g., "slushy", semi-solid vs liquid); and (b) surface roughness and asperities increase due to intermetallic crystal growth.

The present disclosure pairs one of several liquid metals with a solid contact material, using a stabilized interface between the liquid and solid to promote adhesion of the liquid metal to the solid contact while restricting reactions between the liquid metal and solid metal. The present disclosure includes implementations wherein this interface is fabricated inside a recessed cavity to eliminate the deleterious contributions of the intermetallic crystal asperities during repeated opening and closing of the contact surfaces (i.e., switching). Switch contacts formed in accordance with the present disclosure have been tested, and they have demonstrated electrical resistance of less than 100 microOhms, 10 to 100 times lower than the several milliOhms for a solid state relay or tens of milliOhms for a conventional electromechanical contact.

Liquid metals, including the Galinstan alloy, have been used as a flowing bridge between two stationary electrodes. Some of this work has been used to demonstrate the possibility of stabilizing the surface of an electrode prior to exposing it to the Galinstan alloy. U.S. Pat. No. 6,570,110 describes the use of liquid gallium or gallium alloy to bridge the space between two fixed electrodes.

In the present disclosure, a multi-layer material interface is provided within fabricated topographical geometries on one or both solid contact surfaces. In summary, this engineered system comprises one or more of several key functional features: (1) a liquid metal that maximizes both mechanical compliance and surface area through which to conduct electrical current; (2) a rationally designed and intentionally reacted intermetallic layer (which could be crystalline, quasi-crystalline, or amorphous) that establishes chemical stability between the liquid metal and the adjacent underlying material(s) and therefore also promotes adhesion between liquid metal and the solid contact surface; (3) a contiguous diffusion barrier layer that prevents atomic transport and chemical reactions between the liquid metal and the underlying material(s); (4) a primary base contact material layer that forms the majority of the electrical current path; and (5) fabricated topographical geometries (e.g., recesses and/or asperities) in the base contact layer that serve to (a) register and level the solid-solid contact interaction in the closed state (e.g., providing a "hard stop"), (b) displace the intermetallic layer, which may have nano-to-microscale topographical structural features either natively/incidentally or intentionally created, away from the solid-solid contact interface and thus limit the potential for electrical arcing, and (c) protect the intermetallic layer and/or barrier layer from repeated mechanical impact and potential deformation during the act of switch closure; and (6) a second contact formed of a conductor that is robust against reactions with the liquid metal but which may not easily wet with the liquid metal and may or may not be itself wetted with liquid metal.

Each of the key technical and functional features is described in greater detail below.

Liquid metal: A gallium-based alloy (nominally 68.5% gallium, 21.5% indium, 10.0% tin by weight) is employed in a thin-film form or as droplets, either continuously across the contact surface or in select areas that may be defined by lithographic patterning of the underlying intermetallic adhesion layer and/or the physical topographical geometries (e.g., physical confinement). The underlying intermetallic adhesion layer and liquid metal are applied to one (preferably) or both sides of the opposing contact surfaces using a liquid dispenser. It is to be understood that these metals may also be deposited in colloidal suspensions or physical vapor deposition (e.g., sputtering, thermal or electron-beam evaporation), possibly followed by annealing to homogenize the alloy. Other suitable conductive liquids at or near room temperature may include elemental gallium and other gallium-based alloys (e.g., with indium, tin, zinc, and/or bismuth), mercury, sodium potassium alloy (NaK), cesium, rubidium, and francium. Adding other components to the liquid metal mixture may provide enhanced characteristics, such as adding cesium to NaK to lower its freezing point to −78° C., or adding lithium to NaK to improve its ability to attach to copper or other metals.

Intermetallic layer: Tantalum-gallium binary-phase intermetallic crystals are employed as an interface between the liquid metal and the underlying materials. Tantalum is selected in one implementation because it performs well due to its low solubility in gallium (e.g., ≤0.1 weight % at 600° C.) compared to most other metals, and its most prominent phases on the gallium-rich side of the phase diagram (TaGa2, TaGa3) are stable in the presence of gallium up to at least 520° C. Testing and experimentation confirms no detectable intermetallic formation reactions occur between either tantalum and indium or tantalum and tin. Tantalum is deposited by magnetron sputtering to achieve a film of approximately 500-1000 nanometers (but could range from 1 nanometer to 1 millimeter), the thickness of which is important to overcome the surface roughness of the underlying layer (e.g., one implementation employs tungsten with root mean-square roughness values 400-1200 nanometers). Other methods for depositing tantalum include electron-beam evaporation, thermal evaporation, chemical-vapor deposition, electrochemical deposition, and colloidal film casting.

During the contact formation process, the gallium or gallium-based alloy is then deposited (see above) on the tantalum film and the materials are annealed in an inert atmosphere for dwell time of 10 min to 70 hours at temperatures spanning 200-650° C. Typically, this is run for 2 hours at 550° C. in atmospheric-pressure argon (≤0.2 ppm O2, ≤0.5 ppm H2O) and then left to cool to room temperature without quenching or removing excess liquid metal. This process may be accelerated by rapid thermal annealing using radiant heaters at temperatures up to 1060° C. (melting point of TaGa2). During this annealing process, the tantalum reacts with the gallium to form Ta—Ga crystals ranging 0.1-15 micrometers, which energy dispersive X-ray spectroscopy (EDS) analysis indicates are primarily TaGa2 and TaGa3. The excess liquid metal may be removed (e.g., physically with pressurized gas stream or chemically using anhydrous hydrochloric acid in ethanol) and replaced with fresh Galinstan alloy to maintain the eutectic stoichiometry in the bulk liquid for subsequent contact operation. Other useful metals that could be reacted in this application to form the intermetallic interfacial layer include titanium, vanadium, chromium, iron, zirconium, niobium, ruthenium, molybdenum, tungsten, and rhenium.

Diffusion barrier: A diffusion layer should be contiguous with no porosity and minimal vacancy defects through which the liquid metal is able to diffuse and reach the pure solid metal in the base contact. It should be sufficiently thick to prevent undesirable interactions, yet sufficiently thin to maintain low electrical resistance. The thickness of this barrier may be between 10 nanometers and 10,000 nanometers, depending on the application. In one implementation such diffusion barrier layer may have a thickness between 10 and 200 nanometers. In other implementations the thickness may be between 200 and 500 nanometers, between 500 and 1000 nanometers, 1000 and 5000 nanometers or 5000 and 10,000 nanometers. Two implementations of the diffusion barrier are described herein. One implementation leverages a high-stability intermetallic phase of the liquid metal and base contact metal formed in situ and thus limits further reactions between the two materials. There may be one intermetallic phase that acts as both adhesion promoter and diffusion barrier, or multiple intermetallic phases. In one implementation a high-stability gamma-phase Cu4Ga9 was used on a copper base contact with lower-stability theta-phase CuGa2 on top (as validated by cross-sectional SEM/EDS), interfacing with the liquid metal Galinstan alloy.

The other implementation of the diffusion barrier involves depositing a third material positioned in the stack between the intermetallic and base contact material. In one implementation tungsten is used because it is known to be an excellent barrier against copper diffusion, and testing and experiments show it is stable in the presence of gallium without degradation to temperatures as high as 650° C. Tungsten can be deposited on a copper base contact material by magnetron sputtering, chemical-vapor deposition, electrochemical deposition, co-sputtering of copper and tungsten to create a gradual transition from copper to tungsten to mitigate thermal mismatch effects, or diffusion bonding of two foils of copper and tungsten. Other diffusion barrier materials may include ruthenium, titanium, tantalum, titanium nitride, tantalum nitride, tungsten nitride, niobium nitride, molybdenum nitride, titanium-tungsten alloy, tantalum carbide, cerium oxide, and graphene.

Base contact: Copper contacts can provide a low on-resistance in a switch device. The implementations of the diffusion barrier described above enable the use of copper with liquid metals that would otherwise react with and corrode a copper base contact. Other less conductive base contact materials, including tungsten, molybdenum, tantalum, and niobium, may be selected instead of copper in exchange for better chemical compatibility and stability with the liquid metal and other materials in the multi-layer system.

Topographical geometries: In this implementation, a positive stop is created for the contacts by machining one or more pockets in at least one of the electrodes. The non-wetted opposing electrode will make mechanical contact with the top of the pocket wall, providing a well-defined gap and volume in which the liquid metal may remain. The pockets may be formed with two sections with different depths as described in the representative implementation below and illustrated in the accompanying figures.

Figure 15A:
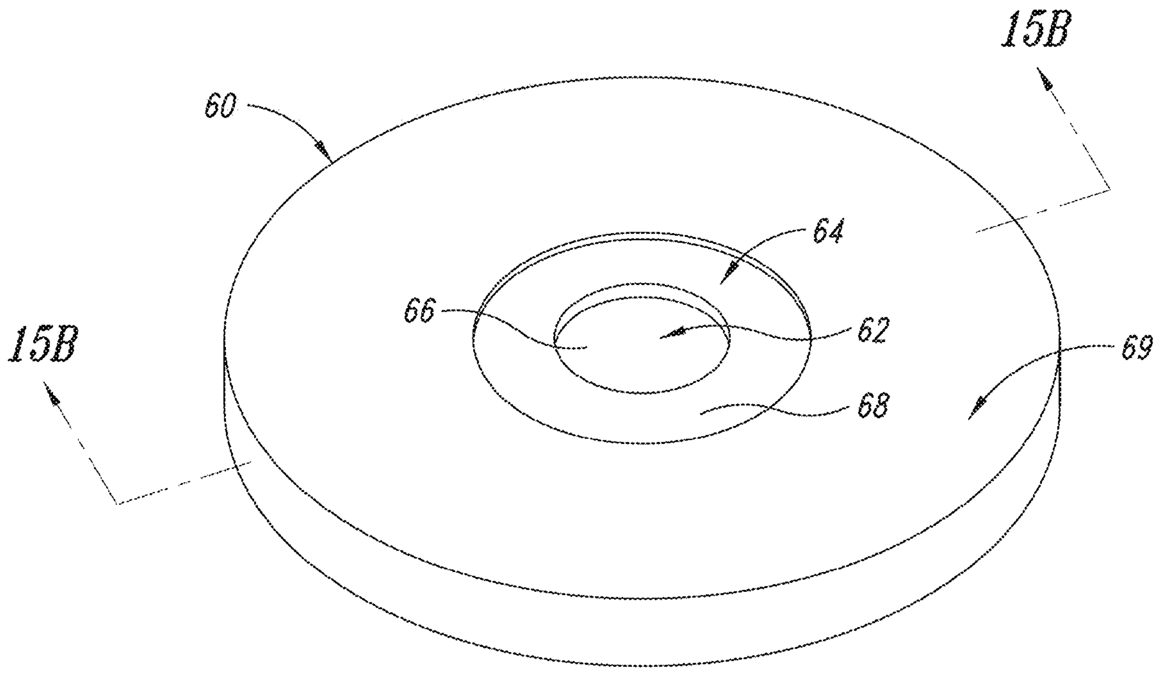
FIGS. 15A and 15B is a cross section taken along lines 15B-15B in FIG. 15A that illustrate a contact member formed in accordance with one implementation of the present disclosure.
Figure 15B:
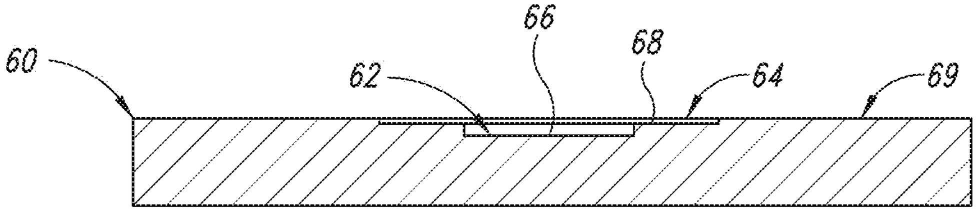

Referring to FIGS. 15A-15B, shown therein is a representative first contact 60 having a centrally located circular pocket 62 having a wall 63 (shown in FIG. 16) surrounded by a shallower circumscribing pocket 64. Both pockets are circumscribed by a larger ring surface area 69 that acts as a stop. It will be appreciated that the pockets 62, 64 could be formed in other geometric planform shapes including ovals. The pockets 62, 64 may be formed using any acceptable technique known to those of skill in this technology, including without limitation machining on a milling machine, laser machining using pulsed or continuous wave lasers, photochemical etching, electric discharge machining (EDM), reactive ion etching, or any other technique suitable for making pockets of the desired geometry.

Figure 20A:
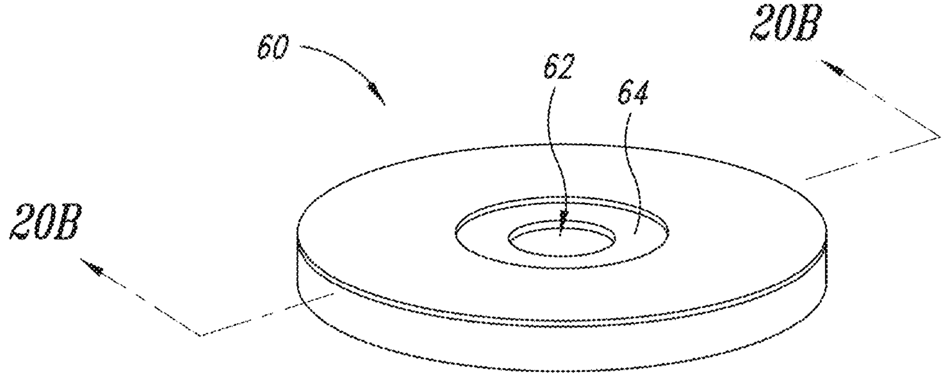
FIG. 20A is an axonometric illustration of a means of assembling a contact by laminating multiple layers.
Figure 20B:
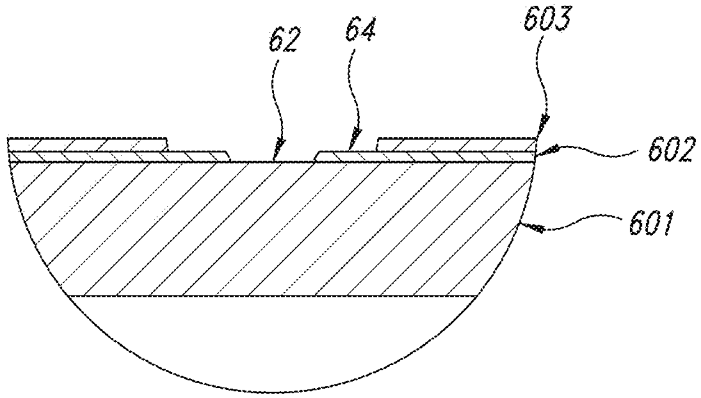
FIG. 20B is a cross section view taken along line B-B of FIG. 20A.

These pockets 62, 64 of varying areas or geometries may be formed by stacking and laminating layers of planar material. Each size and shape of opening may then be cut completely through the material using a saw, laser, water jet, or other cutting technique. The layers may be bonded by the use of adhesive, welding, soldering, or any other technique. This means of forming pockets is illustrated in FIGS. 20A and 20B. As an example, the pocket 62 may be formed by bonding a layer 602 with a circle cut through it to the surface of a layer 601 with no hole. The pocket 64 may then be formed by bonding a layer 603 with a larger diameter hole atop the layer 602.

Figure 21A:
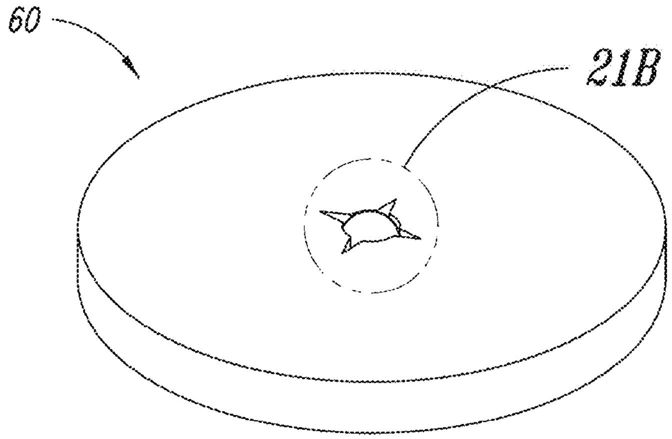
FIG. 21A is an axonometric illustration of a droplet of liquid metal in an open contact with dendritic channels.
Figure 21B:
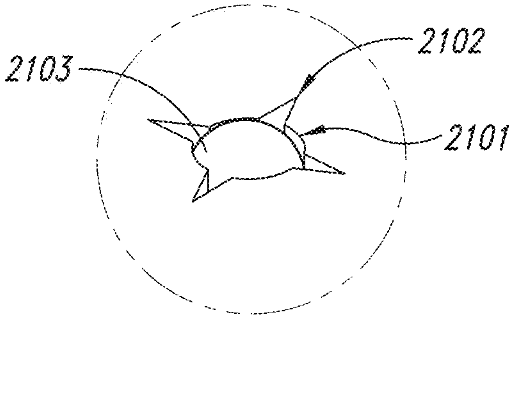
FIG. 21B is an enlarged detail view of a portion of FIG. 21A.

An alternate geometry could achieve the same purposes of first containing the liquid metal and second allowing it to spread when the movable contact applies pressure. This approach is illustrated in FIGS. 21A, 21B and 22A-22C. A complex shape is cut consisting of a central pocket 2101, 2201 and one or more arms or "dendrites" 2102, 2202 radiating from this shape. FIGS. 21A and 21B show the open contact in which the liquid metal 2103 has not been compressed. The liquid metal 2103 at rest naturally accumulates in the central pocket 2101 for two reasons. First, a bottom surface of this central pocket 2101 may have a different surface causing it to wet, or attract the liquid metal, while a bottom surface of the dendrites may be treated in a way to repel the liquid metal. Second, as described below, surface tension will cause the liquid to prefer a shape which does not extend into the arms.

Figure 22A:
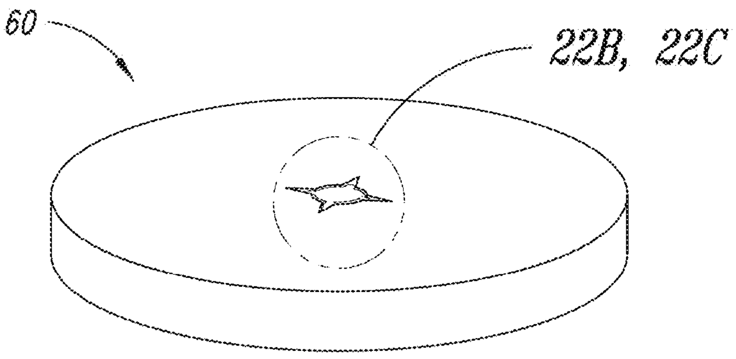
FIG. 22A is an axonometric illustration of a droplet of liquid metal in a closed contact with metal pushed into the channels.
Figure 22B:
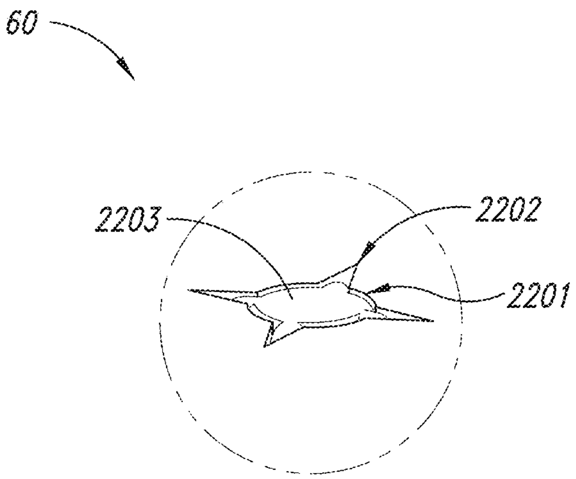
FIG. 22B is an enlarged detail view of a portion of FIG. 22A.
Figure 22C:
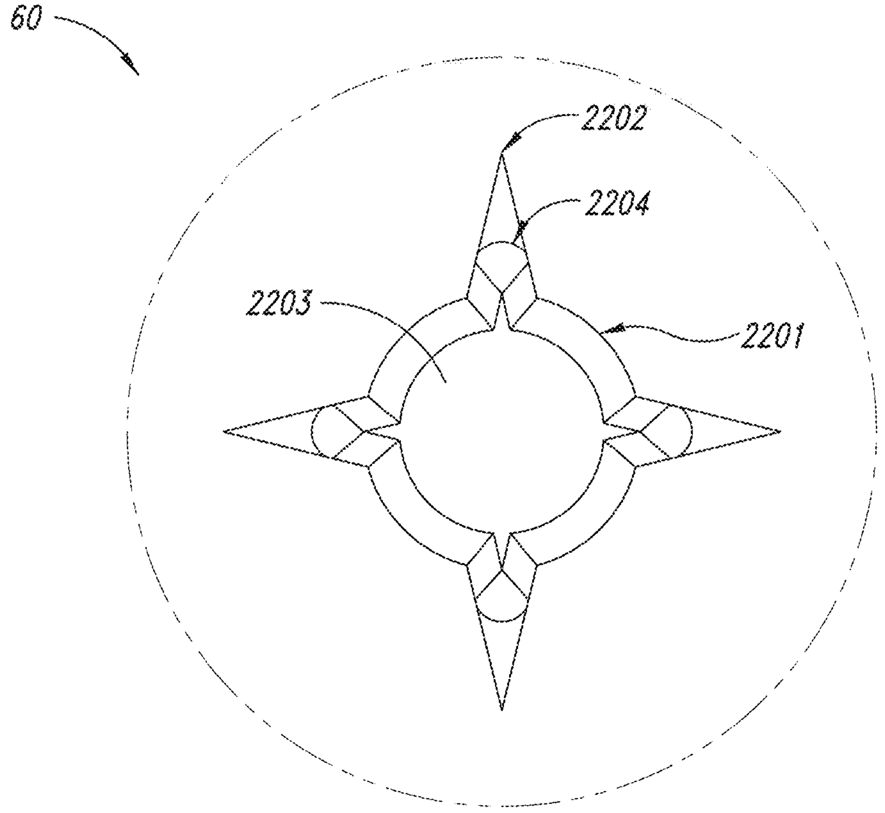
FIG. 22C is an enlarged top plan view of a portion of FIG. 22A.

FIGS. 22A-22C show the closed contact (with the upper contact not illustrated). In these FIGS. 22A and 22B, the liquid metal 2203 is pushed into the dendrites 202. Its surface area increases. Surface tension then exerts a restoring force pulling the metal back into the central cavity. The geometry of the dendrites 2202 can affect this restoring force. If the dendrites 2202 are too broad, the restoring force is weaker as the surface area is not maximized. If the dendrites 2202 are too narrow then the liquid metal may not enter the dendrites 2202 to any appreciable amount. If the dendrites 2202 are both long and narrow, then some of the liquid metal may form spherical or near spherical satellites in the dendrite cavity and this metal may become dissociated from the bulk of the liquid metal.

The ideal width of the dendrites or arms may be calculated by considering the pressure to which the liquid metal is subjected and surface tension forces resulting from driving it into the arms. For example, with a given actuation force available for compressing the material, the increase in pressure within the liquid metal is limited. In one design, this pressure can be 9.4 pounds per square inch (PSI). This pressure must balance with the resistance pressure caused by the curvature of the liquid metal surface as it bends into the arm. The pressure and the radius of curvature are inversely related as described by Laplace's law. A pressure of 9.4 PSI will be balanced at a curvature dependent on the surface tension of the liquid metal. Literature values for surface tension for eutectic Galinstan range from 534 to 718 mN/m (milli-Newton/meter). This results in a minimum radius of curvature between 0.017 and 0.022 mm. This radius of curvature 2204 is shown in FIG. 22C. Calculating using the lower surface tension value, with an arm width of 0.034 mm, the liquid metal can push entirely into the arm with 9.4 PSI of pressure. If the arm is narrower than two times the minimum radius of curvature described above, the liquid will only go part way into the arm, forming a dome-like protrusion with the minimum radius. This will result in much less available movement of liquid metal. If the arm is significantly wider than twice the minimum radius, the restoration force will be reduced due to the larger radius of the liquid metal pushed into the arm.

The volume available in one or more arms is the sum of the volumes in each arm accessible at the given pressure. The number of arms may be calculated by determining the volume of liquid metal which extends above the hard stop of the second contact. This volume must be displaced into the miniature reservoirs created by the arms. Calculating the accessible volume in each arm and dividing that into the volume above the hard stop minus the available volume in the main reservoir provides the minimum number of arms required to avoid the liquid metal from escaping the reservoir or pushing up the hard stop.

This alternate geometry using arms may be advantageous over the previously discussed approach using pockets with stepped diameters. In the case where the pocket is formed by a stack of layers, the dendritic pocket is formed with only two layers; one solid and one with the dendritic arms and main reservoir, while the stepped approach requires three layers; a first layer to provide the bottom of the hole and a second and a third layer to provide the two stepped pockets of different diameters.

Another implementation of the present disclosure uses a simple first pocket, only a section of the floor of which is treated to wet the liquid metal. When the liquid metal is compressed, it will flow outward onto the non-wetted surface. When the pressure is relieved, the liquid metal will be restored to its rest position by the forces generated from surface tension and from repulsion from the non-treated portion of the pocket floor.

The dimensions described below are representative for illustration. Other dimensions could work equally well depending upon the application. The shallower pocket 64 in FIGS. 15A-15B is, in one representative implementation, 400 micrometers in diameter and 10 micrometers deep. In the center of this pocket 64 is the deeper section or pocket 62, which is, in one representative implementation, 200 micrometers in diameter and 35 micrometers total depth. The bottom 66 of the deeper pocket 62 is, in one representative implementation, 65 micrometers below the bottom 68 of the larger, shallower pocket 64. The bottom exposed surface 66, 68 of each pocket 62, 64, respectively, may have an intentionally designed surface finish. For example, each bottom surface 66, 68 may be polished, or finished with a matte texture, or with a patterned and/or tailored structure. In the sputter coater a mask is used to prevent coating of the bottom surface 68 of the larger pocket 64 or the top surface 69 of the first contact 60.

Figure 16:
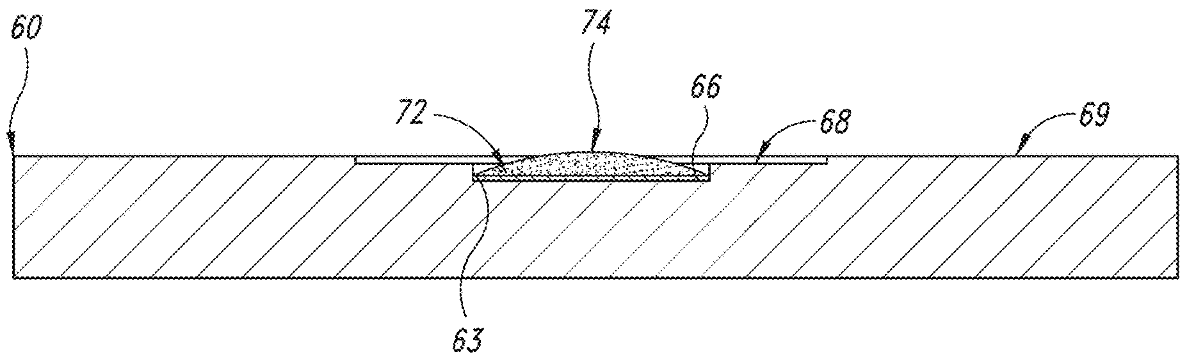
FIG. 16 illustrates wetting of a tantalum layer in the contact member of FIGS. 15A and 15B.

FIG. 16 shows an exaggerated tantalum layer 72 on the bottom surface 66 of the deeper pocket 62. Typically this layer 72 is very thin. It may be deposited as a monolayer of atoms with a minimum thickness of four angstroms, the diameter of a single atom. This layer 72 may be contiguous or may have some voids or pinholes. It may range in thickness from 4 angstroms to 100 angstroms, or from 1 nanometer to 10 nanometers, or from 10 nanometers to 1 micron, or from 1 micron to 100 microns, or from 100 to 1000 microns. A liquid metal coating 74 is formed by a droplet of Galinstan dispensed onto the tantalum layer 72. The first contact 60 is processed as described above to drive the reaction between the tantalum layer 72 and the Galinstan liquid metal coating 74 to a stable point. The liquid metal coating 74 is applied with sufficient volume to form a convex meniscus as seen in FIG. 16 that rises above the top surface 69 of the first contact 60. Thus, when the metal contact 60 is in contact with a movable flat electrode, such as a second contact 76 as described below and shown in FIG. 18, any intermetallic layer on the surface of the tantalum layer 72 is not in contact with the movable flat electrode or second contact 76.

Figure 17:
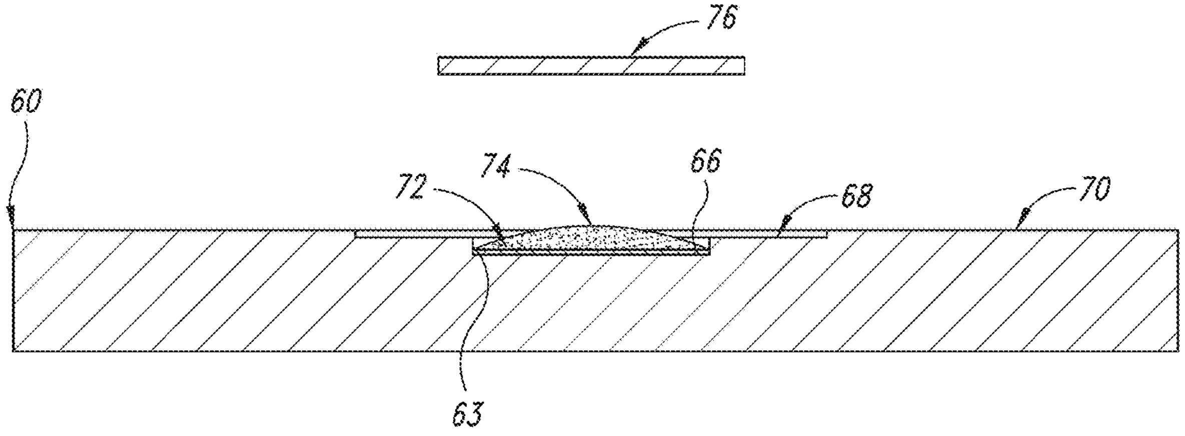
FIG. 17 illustrates a contact in an open state in accordance with the present disclosure.
Figure 18:
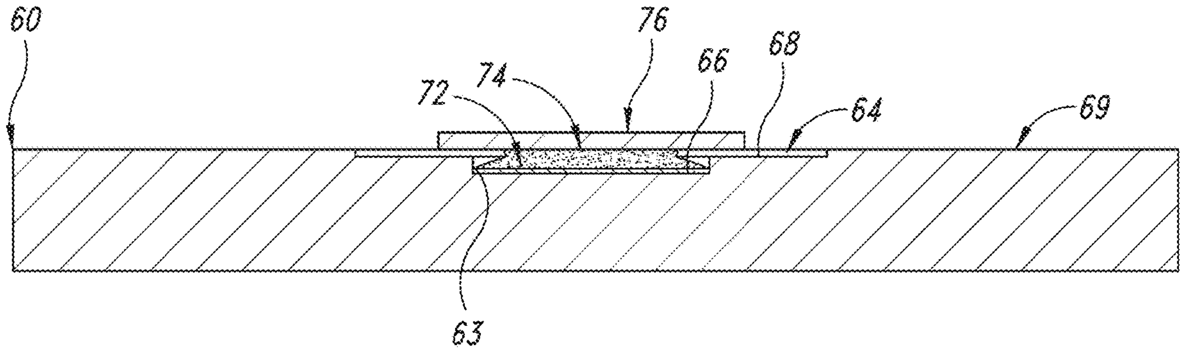
FIG. 18 illustrates a contact in a closed state in accordance with the present disclosure.

More particularly, FIG. 17 shows the second contact 76 positioned above the first contact 60 in an open state, and FIG. 18 shows the contacting of the opposing second contact 76 with the liquid metal coating 74 in a closed state. Ideally, this second contact 76 fits within a boundary of the larger, shallower outer pocket 64. A positive stop for the two contacts 60, 76 is provided by a metal-on-metal abutting at the bottom surface 68 around the perimeter of the shallower outer pocket 64. The liquid metal coating 74 is flattened by contact pressure from the second contact 76. The liquid metal coating 74 is retained mechanically by the side wall 63 of the deeper pocket 62, and it is further kept in the desired location by chemical attraction to the tantalum layer 72 on the bottom 66 of the pocket 62 and by capillary repulsion from the bare metal (e.g., tungsten) elsewhere. Any excess liquid metal displaced by the pressure from the opposing second contact 76 flows into the shallower pocket 64. Upon opening of the contact 76, the liquid metal coating 74 is driven back into the meniscus shape because of the repulsive force between the metal (e.g., tungsten) of the first contact 60 and the liquid metal coating 74 as well as by the surface tension in the liquid metal coating 74.

Figure 19:
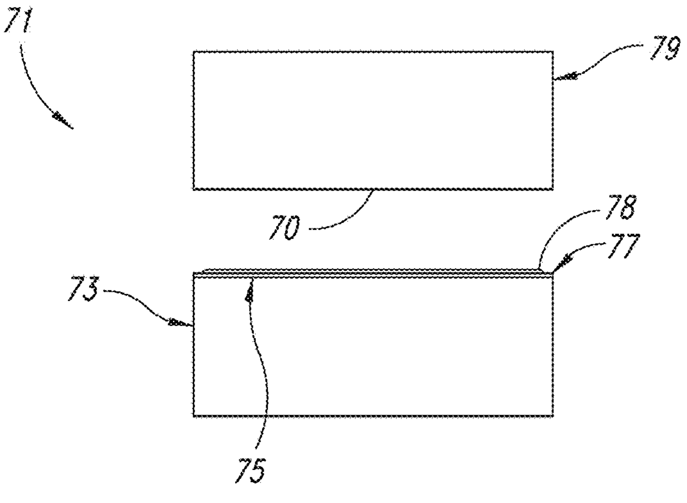
FIG. 19 illustrates a contact pair in which neither contact is machined with a pocket in accordance with the present disclosure.

FIG. 19 illustrates a contact pair 71 in which neither contact is machined with a pocket. In this case, a first contact or base contact 73 is comprised of several materials. The base contact 73 has a flat, planar upper surface 75 that is coated first with a bonding layer 77. A liquid metal layer 78 is then deposited atop the bonding layer 77. A second contact 79 has a flat lower surface 70. In FIG. 19 this contact pair 71 is shown in the open position. In the closed position the second contact 79 will be pressed against the liquid metal layer 78, making electrical contact. The liquid metal layer 78 will be contained in this case by its attraction to the bonding layer 77.

It will be further appreciated from the foregoing that one advantage achieved by the present disclosure is adding a pocket to contain the Galinstan alloy, which prevents mechanical damage to the wetting intermetallic layer, increasing the durability of the contact. In addition, coating the metallic contact (e.g., tungsten) with a thin layer of tantalum allows wetting by a liquid metal such as Galinstan alloy, and it allows the use of tungsten for the bulk material. Tungsten has lower resistivity ($5.6*10^{-8}$ ohm-meter) than tantalum ($1.3$ & $10^{-7}$ ohm-meter) and therefore provides a lower resistance for the device.

Power Relay Circuit Design Selection

The foregoing actuator and contact implementations may be combined to provide a power relay circuit as discussed more fully below.

Relay Construction

The MEMS relay is an assembly of a MEMS actuator and one or more sets of contacts. The previously discussed MEMS actuator is constructed using a set of micro-machined layers and the previously discussed two methods of forming extremely low-resistance contacts are building blocks for the relay. This low contact resistance is critically important for constructing a miniature high-current relay, as it enables the relay to operate without a large heat sink to dissipate the energy which would be converted to heat in a conventional set of contacts.

Dielectric Withstand (Standoff) Voltage

When the relay is in its open state, it must be able to prevent arcing between the input and output contacts. The relationship between the voltage applied between two contacts and the distance an arc will travel between the two contacts is described by the Paschen curve for a particular gas at a given pressure. Other factors also apply, including the type and pressure of any gas or liquid filling the gap between contacts. For a given contact configuration, the maximum voltage which can be applied without causing an arc is called the dielectric withstand voltage. Relays are rated for dielectric withstand voltage between contacts. An example of a typical commercial relay designed for operation at 120 VAC lists a dielectric withstand voltage of 750 Volts or 1000 Volts.

Contact Geometry

Figure 23A:
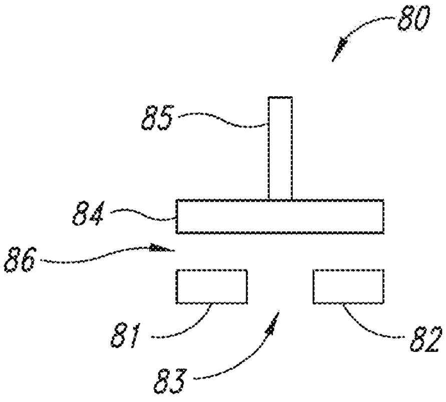
FIGS. 23A and 23 B illustrate a relay in the open and closed states, respectively, in accordance with the present disclosure.
Figure 23B:
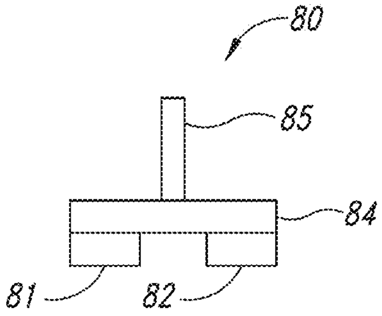

Contact geometry plays an important role in the function of the power relay. The resistance of a metallic structure is inversely proportional to the cross-sectional area through which current flows, and linearly proportional to the length of the current path through the metal. In a MEMS device the cross-sectional area is inherently limited by the small size of the device. To minimize resistance we must also minimize the length of the current path through the entire relay. The subject design accomplishes this by using a crossbar approach. One variant of this design is shown in FIG. 23A and FIG. 23B. FIG. 23A illustrates a relay 80 in its open state. The drawing in FIG. 23B shows the relay 80 in its closed, or conducting, state. The input contact 81 and output contact 82 are arranged level with each other with a gap 83 between them. The gap 83 is sized to provide adequate separation to prevent arcing at the relay's rated voltage. This gap size is computed based on the required voltage for the relay to withstand, and the dielectric value and pressure of the gas or liquid which fills the space within the gap.

In addition to the fixed contacts 81, 82, the relay includes a movable contact 84. This contact is connected to a magnetic rotor 85. The rotor 85 is located in an open bore of one or more coils (not shown in this view) that, when carrying electrical current, can apply axial forces to the rotor 85 and hence the movable contact 84.

When the movable contact 84 is in its open position, as shown in FIG. 23A, the relay 80 is open and no current can flow from the input contact 81 to the output contact 82.

FIG. 23B shows the same relay 80 with the set of contacts 81, 82 and rotor 85 in the closed position. In this state, the movable contact 84 in the form of a crossbar makes physical and electrical contact with the input contact 81 and the output contact 82. Electrical current can now flow through the relay 80 from input contact 81 through movable contact 84 or crossbar to the output contact 82, or in the reverse sense from contact 82 through movable contact 84 to the other contact 81.

Actuator Considerations

Because actuation force is proportional to acceleration, the total initial force at the beginning of a stroke (the sum of latching, actuation, adhesion of liquid metal, dynamic resistances caused by fluid mechanics and flexure forces) disproportionately determines the time required to switch. To maximize force at the beginning of a stroke, the flexure can be used like a spring or preload. In this application, the flexure can be designed to provide an opening force which is opposite in direction to the latching force and is of less magnitude. This opening force from the flexure adds to the force caused by the magnet in the field from the coils, increasing the acceleration as the plunger moves away from the latched position.

The actuator must provide enough travel distance to open an adequate gap between the crossbar and the contact pair. This distance must be at least one-half of the required dielectric withstand distance. The gap 86 between the input contact 81 and the movable contact 84 or crossbar and the related gap between the movable contact 84 and the output contact 82 are in series electrically. The dielectric withstand voltages of the two gaps may therefore be summed. As the gaps are equal in size by the design of the crossbar and contacts, each gap must support an equal portion of the total dielectric withstand voltage. The gaps supported by the MEMS actuator travel are 200 micrometers. Other gap distances which would provide useful standoff voltages would be from 100 to 150 micrometers, from 150 to 200 micrometers, or from 200 to 250 micrometers or larger.

Contact Considerations

One of the most important attributes of a relay is contact resistance. As electricity flows through the relay some of the energy is converted to heat. The amount of energy released in watts is the product of the resistance and the square of the current. When two rigid surfaces are placed in contact, they touch in only a few places, the asperities which are the highest point on the surface. As more force is applied to press the contacts together, the asperities deform and flatten, leading to an increase in surface contact area and a corresponding decrease in electrical resistance. In miniature relays it is difficult to generate large contact forces because of the small physical size of the magnets and coils. In standard small relays, the contact resistance is typically in the range of 30 to 50 milliOhms. The novel solution to this contact resistance problem in the current invention is to incorporate one of two options for low-resistance, low-contact-force contacts. These approaches, described separately elsewhere, are a stabilized liquid-solid contact and a micromachined array of flexible contacts.

Figure 24:
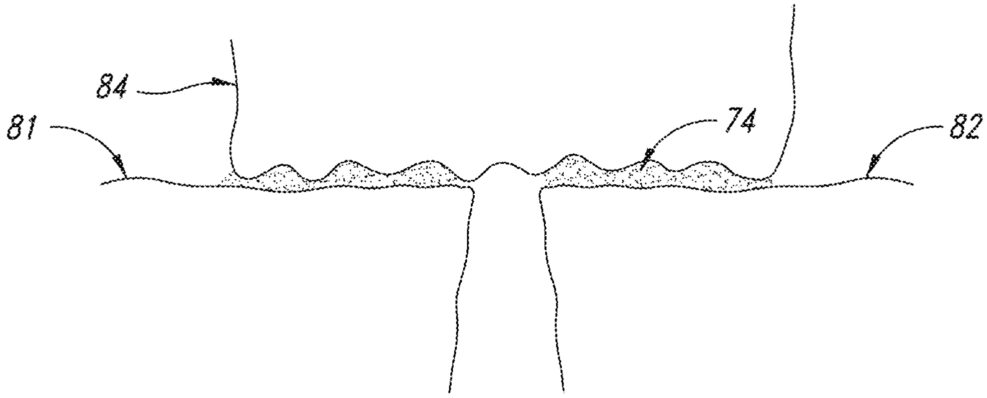
FIG. 24 illustrates the use of a liquid layer on a contact in accordance with the present disclosure.

For either the stabilized liquid-solid contact or micromachined array of flexible contact solution described above, the specialized contact material may be located on either the fixed or movable contacts, or both. In FIG. 24, a wetted surface 74 of the liquid-solid contact may be applied to the surfaces of both fixed contacts 81, 82 which are closest to movable contact 84, or it may be applied to the surface of movable contact 84 that is closest to the fixed contacts 81 and 82.

For the micromachined array of flexible contacts described previously, the flexible contacts are machined into one of the contact surfaces for each contact pair. Thus, the surfaces of input contact 81 and output contact 82 that are closest to the movable contact 84 could have an array of micromachined contacts, or the surface of the movable contact 84 closest to the two contacts 81, 82 could be covered with such an array.

Other Contact Arrangements

Conventional relays are available in a number or circuit configurations, or 'forms.' Each form specifies a number of poles and a number of throws. Poles refer to the number of parallel switches controlled by the relay. Poles can be any number, but is often between one and three. Throws refers to the number of positions in which the relay can conduct. Throws is typically either one or two, often called single throw or double throw. For example, a relay incorporating multiple open-close switches may be described as single pole, two pole, or three pole, where each pole refers to an individual switch. A two pole double throw relay would have two separate switches, each with a common terminal which can connect to one of two switched terminals. In a non-latching relay, one of the two switched terminals is commonly designated Normally Open (NO) and the other terminal is commonly designated Normally Closed (NC). Because a latching relay is stable without power applied in either an open or closed state, the terms NC and NO do not apply.

Multi-Throw Arrangement

Figure 25A:
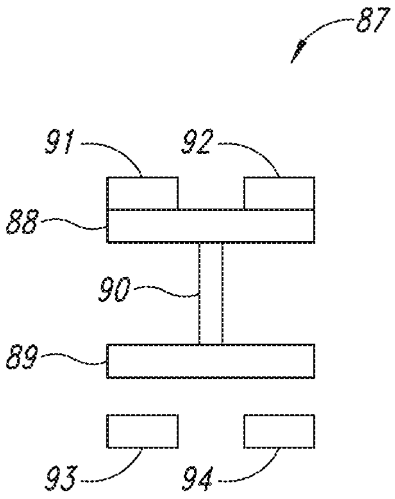
FIGS. 25A and 25B illustrate a double pole relay formed in accordance with the present disclosure.
Figure 25B:
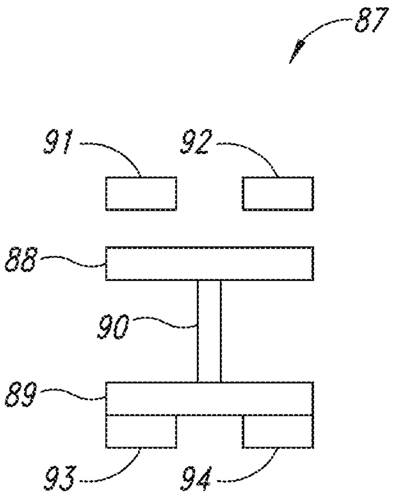

The MEMS relay described herein can also be configured to support multiple poles and multiple throws. FIGS. 25A and 25B illustrate a configuration supporting both Normally Open (NO) and Normally Closed (NC) contacts. In FIG. 25A the relay 87 includes two crossbars 88, 89 arranged at and attached to opposite ends of a rotor 90. This relay 87 also includes two pairs of fixed contacts, an upper pair 91, 92 and a lower pair 93, 94. In FIG. 25A, the contact pair 93, 94 are open, and the upper contact pair 91, 92 are closed. No current can flow from contact 93 to contact 94 because the crossbar 89 is not in contact with these contacts 93, 94. Current can flow from contact 91 to 92 by means of the upper crossbar 88.

FIG. 25B shows the alternate state of the relay 87. The rotor 90 has been driven electromagnetically to the lower position in the view. Now current can flow from contact 93 to contact 94 by way of crossbar 89. Upper contacts 91, 92 are now separated from the upper crossbar 88, resulting in the upper set of contacts 91, 92 being in the open condition.

Multi-Pole Arrangement

Figure 26:
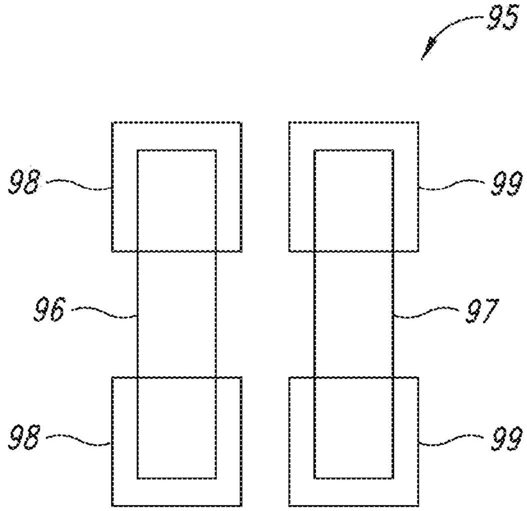
FIG. 26 is a top plan illustration of a double pole relay formed in accordance with the present disclosure.

MEMS relays may be assembled with more complex arrangements of crossbars and contacts. In FIG. 26 a top plan view of a two-pole relay design 95 is shown. The device 95 includes two crossbars 96, 97 that are parallel to each other and attached to a common rotor. Each of the two crossbars is located above a pair of fixed contacts. The left crossbar 96 is located above fixed contacts 98, while crossbar 97 is located above fixed contacts 99. All four fixed contacts 98, 99 are arranged so their upper surfaces are coplanar. When the rotor pushes the crossbars 96, 97 against the fixed contacts 98, 99, two separate circuits are closed. When the rotor pulls the crossbars 96, 97 away from the fixed contacts 98, 99, both circuits are opened.

It can be seen that more than two poles may be created by adding additional crossbars and sets of contacts. The liquid-solid contact or array of micromachined contacts provides necessary compliance allowing connections at all contact surfaces even in the situation where the fixed contact surfaces are not perfectly coplanar.

Multi-Throw, Multi-Pole Arrangements

One skilled in the art of relay design can see that the two concepts illustrated in FIGS. 25A and 25B and FIG. 26 can be combined to form multi-throw, multi-pole relays.

Dielectric Filling Material

The standoff voltage between a set of contacts is affected by the medium filling the gap between the contacts. Various gasses and liquids can provide significantly higher standoff voltage than air does for a given distance between contacts. The relationship between pressure, distance, and standoff voltage is described by Paschen's Law, which allows the prediction of standoff voltage. The design of the relay includes enclosing it in a hermetic package. The package may be filled with gas or liquid with a high dielectric constant to increase the standoff voltage. Further increases are possible by increasing the pressure of the gas within the package. Gasses suitable for this use include nitrogen, argon and sulfur hexafluoride (SF6). Liquids include hexamethyldisiloxane or octamethyltrisiloxane.

Extended Implementations

- Multiple crossbars and contacts sets for N-pole M-throw switching
- Replacement of dielectric gas with liquid (hexamethyldisiloxane)
- Replacement of flexures with bearing surface
- Replacement of wetted contacts with cantilever microarray
- Replacement of adhesive for lamination with welding It is to be understood that various changes can be made to the disclosure to enhance its utility. The various embodiments described above can be combined to provide further embodiments. Aspects of the embodiments can be modified, if necessary to employ concepts of the various patents, applications, and publications to provide yet further embodiments.

The invention claimed is:

1. An electric relay circuit for use with a load, comprising:

a stator assembly that has a chamber partially defined therethrough along a central longitudinal axis, wherein the stator assembly includes a non-conductive substrate, a layer or layers including components with which the load interacts mechanically or electrically, a first ferromagnetic layer that is adjacent to a spacer, a first plurality of coils that is adjacent to the first ferromagnetic layer, a second ferromagnetic layer that is adjacent to the first plurality of coils, a second plurality of coils that is adjacent to the second ferromagnetic layer, and a third ferromagnetic layer that is adjacent to the second plurality of coils, wherein a bottom surface of the third ferromagnetic layer is at a top end of the chamber;

a plunger assembly that is situated in the chamber of the stator assembly and, in operation, moves along the central longitudinal axis between a first position and a second position, the plunger assembly including a plunger that includes a pair of ferromagnetic plates with a magnet situated therebetween, wherein (i) a first ferromagnetic plate of the pair of ferromagnetic plates is situated between the first and second ferromagnetic layers and (ii) a second ferromagnetic plate of the pair of ferromagnetic plates is situated between the second and third ferromagnetic layers; and the pair of ferromagnetic plates and the first, second, and third ferromagnetic layers further cooperating to drive more than one contact, each contact including:

a first contact member having an exposed surface, the exposed surface having asperities that form one or more high points and low points on the exposed surface; and a second contact member having a contact surface, and a plurality of electrically conductive flexures extending from the contact surface;

wherein the first contact member and the second contact member may be moved relative to each other to provide differentiated open and closed positions, and wherein, when the first contact member is positioned adjacent the second contact member in a closed position in which the contact surface of the second contact member is not in electrical contact with the one or more high points on the exposed surface of the first contact member, each flexure of the plurality of electrically conductive flexures is in electrical contact with the exposed surface of the first contact member.

2. The electric relay circuit of claim 1 wherein all of the plurality of electrically conductive flexures extending from the contact surface of the second contact member have an identical height above the contact surface of the first contact member, the height being greater than a sum of a first distance between the high points and the low points on an exposed surface of the first contact member and a separation distance between the exposed surface of the first contact member and the one or more high points of the contact surface of the second contact member when the first contact member is in the closed position.

3. The electric relay circuit of claim 1 wherein the plurality of electrically conductive flexures are formed at less than a right angle to the contact surface of the second contact member.

4. The electric relay circuit of claim 1 wherein each flexure of the plurality of electrically conductive flexures has a planform profile with dimensions between 10 and 50 microns in one direction and between 10 and 50 microns in a dimension perpendicular to the one direction, and further including gaps between adjacent flexures of 20 to 200 microns.

5. An electric relay circuit for use with a load, comprising:

a stator assembly that has a chamber partially defined therethrough along a central longitudinal axis, wherein the stator assembly includes a non-conductive substrate, a layer or layers including components with which the load interacts mechanically or electrically, a first ferromagnetic layer that is adjacent to a spacer, a first plurality of coils that is adjacent to the first ferromagnetic layer, a second ferromagnetic layer that is adjacent to the first plurality of coils, a second plurality of coils that is adjacent to the second ferromagnetic layer, and a third ferromagnetic layer that is adjacent to the second plurality of coils, wherein a bottom surface of the third ferromagnetic layer is at a top end of the chamber;

a plunger assembly that is situated in the chamber of the stator assembly and, in operation, moves along the central longitudinal axis between a first position and a second position, the plunger assembly including a plunger that includes a pair of ferromagnetic plates with a magnet situated therebetween, wherein (i) a first ferromagnetic plate of the pair of ferromagnetic plates is situated between the first and second ferromagnetic layers and (ii) a second ferromagnetic plate of the pair of ferromagnetic plates is situated between the second and third ferromagnetic layers; and the pair of ferromagnetic plates and the first, second, and third ferromagnetic layers further cooperating to drive at least one contact that includes:

a first contact member having a base with an exposed surface, the base having a first pocket opening to the exposed surface, the first pocket having a circumscribing side wall and a bottom wall that defines an interior of the first pocket;

a first metal layer on the bottom wall of the first pocket and having a top surface that is below the exposed surface of the first contact member;

a liquid metal layer on the top surface of the first metal layer and extending above the exposed surface of the first contact member; and a second contact member having a contact surface, the second contact member positioned adjacent the first contact member in an open position and movable to a closed position in which the contact surface of the second contact member contacts and compresses the liquid metal layer and the first metal layer.

6. The electric relay circuit of claim 5 further comprising a second pocket formed in the exposed surface of the first contact member, the second pocket circumscribing the first pocket and having a bottom wall that is below the exposed surface of the first contact member and above the bottom wall of the first pocket, the second pocket further comprising a circumscribing side wall and a bottom wall that define an interior of the second pocket, a portion of the interior of the second pocket overlapping the interior of the first pocket.

7. The electric relay circuit of claim 6 wherein excess material from the liquid metal layer is displaced into the second pocket in response to pressure from the second contact member moving into the closed position and, upon the second contact member moving to the open position, the excess material from the liquid metal layer is driven back to an original shape into a meniscus shape in response to a repulsive force generated between material that forms the first contact member and material that forms the liquid metal layer.

8. The electric relay circuit of claim 7 wherein the repulsive force is further generated by a surface tension in the liquid metal layer.

9. The electric relay circuit of claim 5 wherein the liquid metal layer is formed of a compliant material that is displaced by pressure applied by the second contact member in the closed position and returns to an original shape in response to the second contact member moving to the open position.

10. An electric relay circuit for use with a load, comprising:

a stator assembly that has a chamber partially defined therethrough along a central longitudinal axis, wherein the stator assembly includes a non-conductive substrate, a layer or layers including components with which the load interacts mechanically or electrically, a first ferromagnetic layer that is adjacent to a spacer, a first plurality of coils that is adjacent to the first ferromagnetic layer, a second ferromagnetic layer that is adjacent to the first plurality of coils, a second plurality of coils that is adjacent to the second ferromagnetic layer, and a third ferromagnetic layer that is adjacent to the second plurality of coils, wherein a bottom surface of the third ferromagnetic layer is at a top end of the chamber;

a plunger assembly that is situated in the chamber of the stator assembly and, in operation, moves along the central longitudinal axis between a first position and a second position, the plunger assembly including a plunger that includes a pair of ferromagnetic plates with a magnet situated therebetween, wherein (i) a first ferromagnetic plate of the pair of ferromagnetic plates is situated between the first and second ferromagnetic layers and (ii) a second ferromagnetic plate of the pair of ferromagnetic plates is situated between the second and third ferromagnetic layers; and the pair of ferromagnetic plates and the first, second, and third ferromagnetic layers further cooperating to drive at least one contact that includes:

a first contact member having a base with an exposed surface, a first metal layer on a top surface of the base;

a liquid metal layer on a top surface of the first metal layer and extending above the exposed surface of the first contact member; and a second contact member having a contact surface, the second contact member positioned adjacent the first contact member in an open position and movable to a closed position in which the contact surface of the second contact member contacts and compresses the liquid metal layer and the first metal layer.

11. The electric relay circuit of claim 10 wherein the liquid metal layer is formed of a compliant material that is displaced by pressure applied by the second contact member in the closed position and returns to an original shape in response to the second contact member moving to the open position.

12. The electric relay circuit of claim 11 wherein the first contact member comprises tungsten, and the liquid metal layer comprises a Galinstan alloy, and further wherein the liquid metal layer has a meniscus shape when not under pressure, and the meniscus shape of the liquid metal layer is compressed into a compressed shape in response to the second contact member applying pressure to the liquid metal layer, and in further response to pressure from the second contact member an excess material displaced from the liquid metal layer is displaced into a pocket in the first contact member, and upon the second contact member moving to the open position, the excess material from the liquid metal layer returns to the meniscus shape in response to a repulsive force between tungsten in the first contact member and the Galinstan alloy in the liquid metal layer.

13. The electric relay circuit of claim 12 wherein the repulsive force includes a surface tension in the liquid metal layer.

14. The electric relay circuit of claim 10, wherein:

the base has a first pocket opening to the exposed surface, the first pocket has a circumscribing side wall and a bottom wall that defines an interior of the first pocket;

the first metal layer is on the bottom wall of the first pocket; and the top surface of the first metal layer is below the exposed surface.

15. The electric relay circuit of claim 14 wherein the first pocket includes one or more arms extending from a main pocket, the arms being narrow relative to a size of the first pocket, the arms having a bottom surface and a side surface.

16. The electric relay circuit of claim 15 wherein a surface bottom wall of the first pocket is treated in a way that causes it to attract liquid metal of the liquid metal layer, and the bottom and side surfaces of the arms are treated in a way to repel the liquid metal.

17. The electric relay circuit of claim 16 wherein the bottom surface of the first pocket is treated by applying a coating of a material that wets the liquid metal.

18. The electric relay circuit of claim 14 wherein only a portion of a bottom of the first pocket is treated in a way that causes the portion of the bottom wall of the first pocket to attract liquid metal of the liquid metal layer.

19. The electric relay circuit of claim 18 wherein the portion of the bottom wall of the first pocket is treated by applying a coating of a material which wets the liquid metal.

20. The electric relay circuit of claim 10 comprising a cavity in which the stator assembly and plunger are formed, the cavity filled with a dielectric gas.

21. The electric relay circuit of claim 10 comprising a cavity in which the stator assembly and plunger are formed, the cavity filled with a dielectric liquid.

22. The electric relay circuit of claim 10 wherein the electric relay circuit is structured to provide two throws.

23. The electric relay circuit of claim 10, wherein the first metal layer comprises an intermetallic layer.

24. The electric relay circuit of claim 23, wherein the first metal layer further comprises a diffusion barrier.

* * * * *